United States Patent [19]

Smith

[11] Patent Number: 4,663,892
[45] Date of Patent: May 12, 1987

[54] FORCE-CONTROLLED STEADYREST SYSTEM

[75] Inventor: Roderick L. Smith, Rockford, Ill.

[73] Assignee: Energy Adaptive Grinding, Inc., Rockford, Ill.

[21] Appl. No.: 760,307

[22] Filed: Jul. 29, 1985

Related U.S. Application Data

[63] Continuation-in-part of Ser. No. 445,689, Nov. 30, 1982, Pat. No. 4,507,896.

[51] Int. Cl.$^4$ .............................................. B24B 1/00
[52] U.S. Cl. .................................. 51/289 R; 51/238 S
[58] Field of Search ............ 51/238 R, 238 S, 165.87, 51/289 R

[56] References Cited

U.S. PATENT DOCUMENTS

| 2,638,719 | 5/1953 | Balsiger | 51/238 S |
| 3,330,074 | 7/1967 | Stuckey | 51/238 S |
| 3,425,168 | 2/1969 | Porath | 51/238 R |
| 3,427,755 | 2/1969 | Levesque | 51/238 S |
| 3,427,762 | 2/1969 | Mills | 51/238 R |
| 3,591,987 | 7/1971 | Porath | 51/238 S |
| 3,745,710 | 7/1973 | Hahn | 51/165.87 |
| 3,878,651 | 4/1975 | Nakeda | 51/238 S |
| 4,324,073 | 4/1982 | Belthle | 51/238 S |

FOREIGN PATENT DOCUMENTS

| 162294 | 12/1974 | Japan | 51/238 S |
| 11393 | 2/1978 | Japan | 51/238 S |

Primary Examiner—Harold D. Whitehead
Attorney, Agent, or Firm—Leydig, Voit & Mayer Ltd.

[57] ABSTRACT

A method of grinding a workpiece which is susceptible to deflection and/or deformation when grinding is carried out by relatively infeeding a grinding wheel to keep the wheel face and work surface in relative rubbing contact at an interface region, the method comprising continuously determining the force exerted by the wheel on the workpiece at the interface region as grinding conditions change, continuously applying to the workpiece at least one counterbalance force which in equivalent effect is opposite in sense to the determined force, and variably controlling the counterbalancing force to maintain its effective magnitude equal to the magnitude of the determined force.

33 Claims, 19 Drawing Figures

FORCE-CONTROLLED STEADYREST SYSTEM

CROSS-REFERENCE TO RELATED APPLICATION

This application is a continuation-in-part of my copending U.S. patent application Ser. No. 445,689, filed Nov. 30, 1982 for "Centerless and Center-Type Grinding Systems" and now U.S. Pat. No. 4,507,896 issued Apr. 2, 1985.

FIELD OF INVENTION

The present invention relates generally to grinding systems, or other workpiece-shaping or finishing systems, which use one or more steadyrests to support the workpiece during the grinding or shaping.

The use of steadyrests to support workpieces, particularly long cylindrical workpieces, during grinding has been common practice for many years. More recently, efforts have been made to control the positions of steadyrests by means of servo-control systems which receive signals from gages sensing the workpiece dimensions and attempt to automatically advance the positions of the steadyrests so that they follow the surface of the workpiece as it is ground. These prior efforts, however, have not been completely successful, due in part to the fact that they are unable to cope with workpieces having surfaces that are not concentric with other surfaces on the same workpiece or with the true axis of rotation of the workpiece.

One of the major problems in grinding long cylindrical workpieces—particularly such workpieces that have multiple surfaces to be ground, as in the case of cam shafts having multiple bearing surfaces on the same shaft—is the attainment of precise concentricity of all the ground surfaces with each other and with the axis of rotation of the workpiece. Such concentricity has been difficult to attain in prior grinding systems or, when attainable, has required relatively slow and inefficient grinding operations. One of the reasons it has been difficult to achieve such concentricity is that the force exerted on the workpiece at the grinding interface can vary considerably, even within a single revolution of the workpiece. Any steadyrest has a certain inherent flexibility, and thus the steadyrests deflect slightly, and to different degrees, in response to the changing forces on the workpiece. To a lesser extent, the workpiece spindles and even the wheel slide deflect in response to these same forces. These deflections in turn can cause the ground surfaces to be non-concentric relative to each other and/or the true axis of rotation of the workpiece.

Further problems arise when grinding out-of-round workpieces or workpieces having surfaces that are eccentric relative to their axes of rotation. An out-of-round workpiece has a surface which deviates from a true circle, either because the surface is intended to be non-circular in the final product (such as cam lobes) or because a surface intended to be circular is slightly non-circular as a result of the way it was prepared prior to grinding. An eccentric workpiece has a surface which follows a true circle, or at least a segment thereof, but the center of the circle is offset from the desired centerline of the workpiece.

One of the problems encountered in grinding out-of-round and/or eccentric workpieces is that the workpiece surface can lose contact with one or more steadyrests; then, when the workpiece surface subsequently re-engages the steadyrest, it can produce a "slapping" effect which deflects the workpiece and introduces defects into the surface being ground. Workpiece surfaces that are eccentric relative to the axis of rotation of the workpiece can also produce bowing of the workpiece when the "high" side of the workpiece engages the grinding wheel or one of the steadyrests, thereby making it even more difficult to remove the eccentricity by grinding. Thus, when the "high" side of such an eccentric workpiece engages the grinding wheel, the radial distance from the rotational axis of the workpiece to the grinding interface is at a maximum, thereby increasing the force on the workpiece. This increase in the force tends to bow the workpiece away from the grinding wheel, particularly if such bowing is not firmly resisted by the steadyrests.

When the "low" side of an eccentric workpiece engages the grinding wheel, the radial distance between the rotational axis of the workpiece and the grinding interface is at a minimum. This would produce a low force on the workpiece but for the fact that the "high" side of the workpiece is simultaneously engaging a steadyrest. Thus, the radial distance between the rotational axis of the workpiece and the steadyrest is normally at a maximum at this point, and consequently the force exerted on the workpiece by the steadyrest is also at a maximum. This force tends to bow the workpiece toward the grinding wheel.

The net result of the effects described above is that the eccentricity of the workpiece relative to its axis of rotation is not fully removed by the grinding operation or, at best, is removed at a very slow rate. The steadyrests actually work against removal of the eccentricity because they permit and/or cause undesired bowing of the workpiece, and this bowing is worst in exactly those portions of each workpiece revolution where the most accurate grinding control is needed, i.e., where the workpiece eccentricity is the greatest.

Unbalanced forces on the workpiece can also produce grinding "chatter". This occurs when the workpiece is pulled or pushed off its true axis of rotation and then released, causing it to "snap back" to its true axis of rotation. "Chatter" is an extremely undesirable condition for a grinding operation and leads to excessive wheel wear as well as introducing imperfections into the ground surface.

OBJECTS OF THE INVENTION

It is a primary object of this invention to provide an improved grinding system having steadyrests which continuously provide the desired reaction forces on workpiece surfaces under widely varying conditions. In this connection, one specific object of the invention is to provide such a grinding system which permits rapid and efficient grinding of one or more surfaces on an elongated cylindrical workpiece, while producing a high degree of concentricity of all the ground surfaces and the desired axis of rotation of the workpiece.

A further significant object of the invention is to provide an improved grinding system which permits rapid, efficient and precise grinding of workpieces that are initially eccentric or out-of-round.

Another important object of this invention is to provide an improved grinding system which ensures that the workpiece continuously rotates about the desired axis along the full length of the workpiece, throughout the grinding of the workpiece. In this connection, a related object of the invention is to provide such a grinding system which ensures that the workpiece is not deflected away from the desired rotational axis by the forces exerted thereon by either the grinding wheel or the steadyrests.

Still another object of this invention is to provide such an improved grinding system which avoids steadyrest "slap".

Yet another object of the invention is to provide such an improved grinding system which eliminates, or at least minimizes, grinding "chatter".

It is a further object of this invention to provide such an improved grinding system which also prevents the workpiece from sagging, thereby further ensuring precise concentricity of the finally ground surfaces of the workpieces.

A still further object of the invention is to provide a grinding method and apparatus which determines and signals the value of a force exerted by a grinding wheel on a workpiece despite changes in wheel sharpness, infeed rates, and other conditions at the grinding interface.

Another object of the invention is to provide an improved grinding system for grinding elongated workpieces and which is capable of applying counterbalancing forces (to counterbalance the grinding forces) to the workpiece at one or more longitudinal positions offset from the longitudinal position of the grinding wheel, wherein the applied counterbalancing forces are automatically adjusted to compensate for the longitudinal offset between the positions of the grinding wheel and the counterbalancing forces.

Yet another object of the invention is to provide an improved steadyrest system that can provide many of the same advantages described above, in workpiece-shaping or finishing systems other than grinding systems, such as lathes and the like.

These and other objects and advantages will become apparent as the following detailed description proceeds, taken in conjunction with the accompanying drawings.

IDENTIFICATIN OF DRAWING FIGURES

Figure 9:
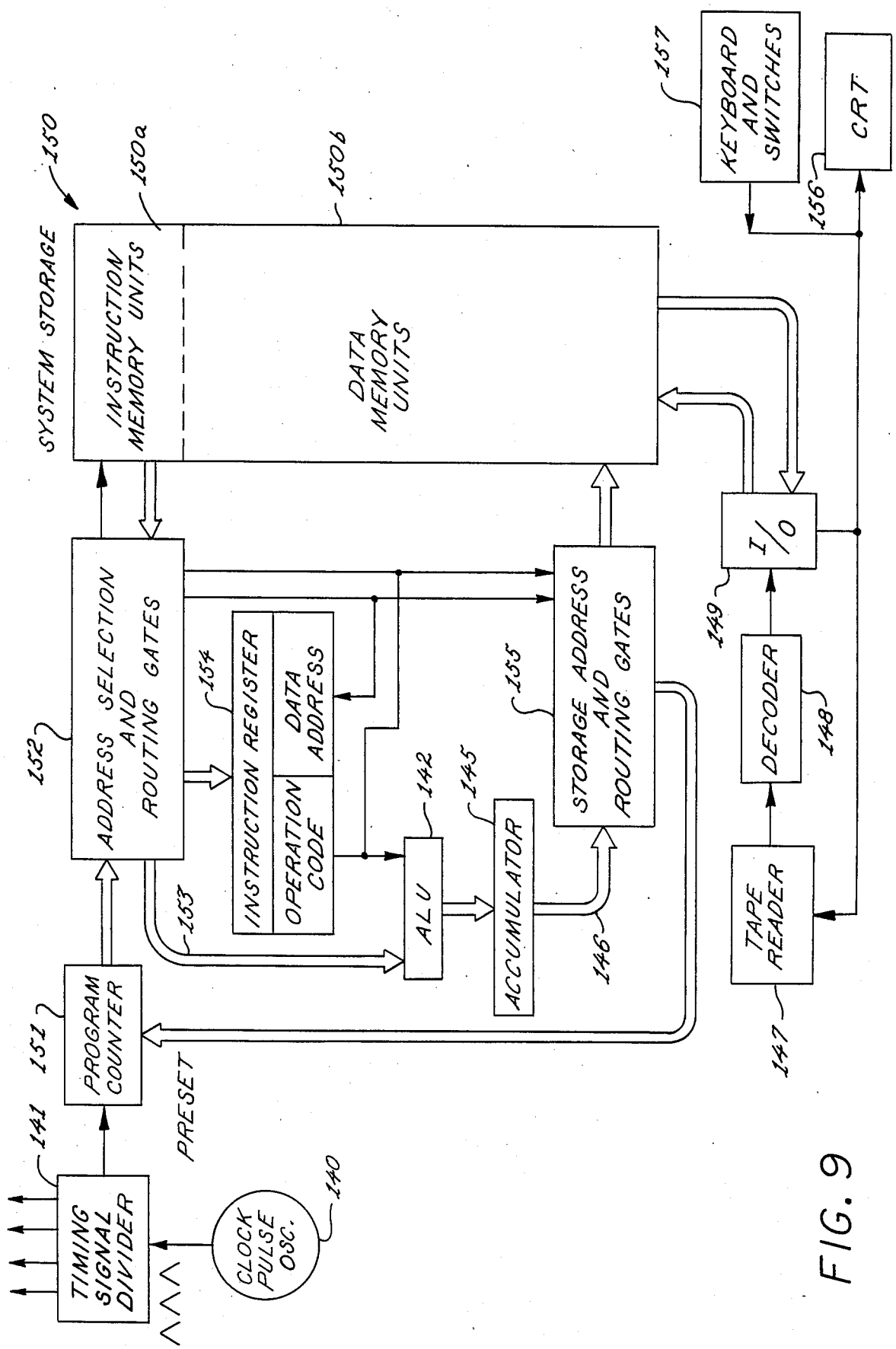
FIG. 9 is a block diagram of one suitable form of digital computer with associated memory or storage, constituting a part of the control apparatus for the grinding machine of FIGS. 1-7.
Figure 10:
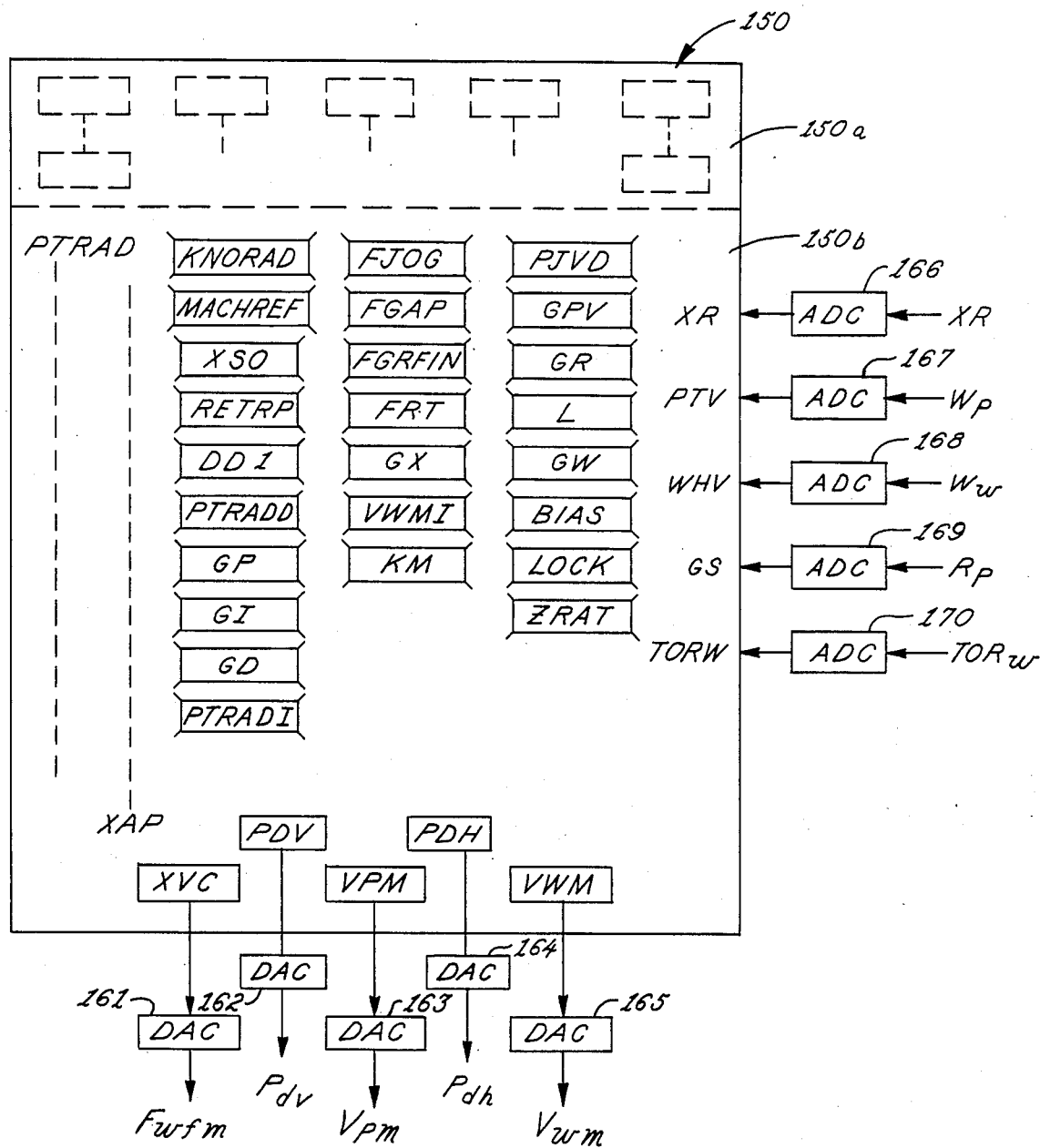
FIG. 10 is a block representation of the signal storage units or memory for the computer of FIG. 9, when used to control the grinding machine of FIGS. 1-7 in accordance with one embodiment of the invention.
Figure 11A:
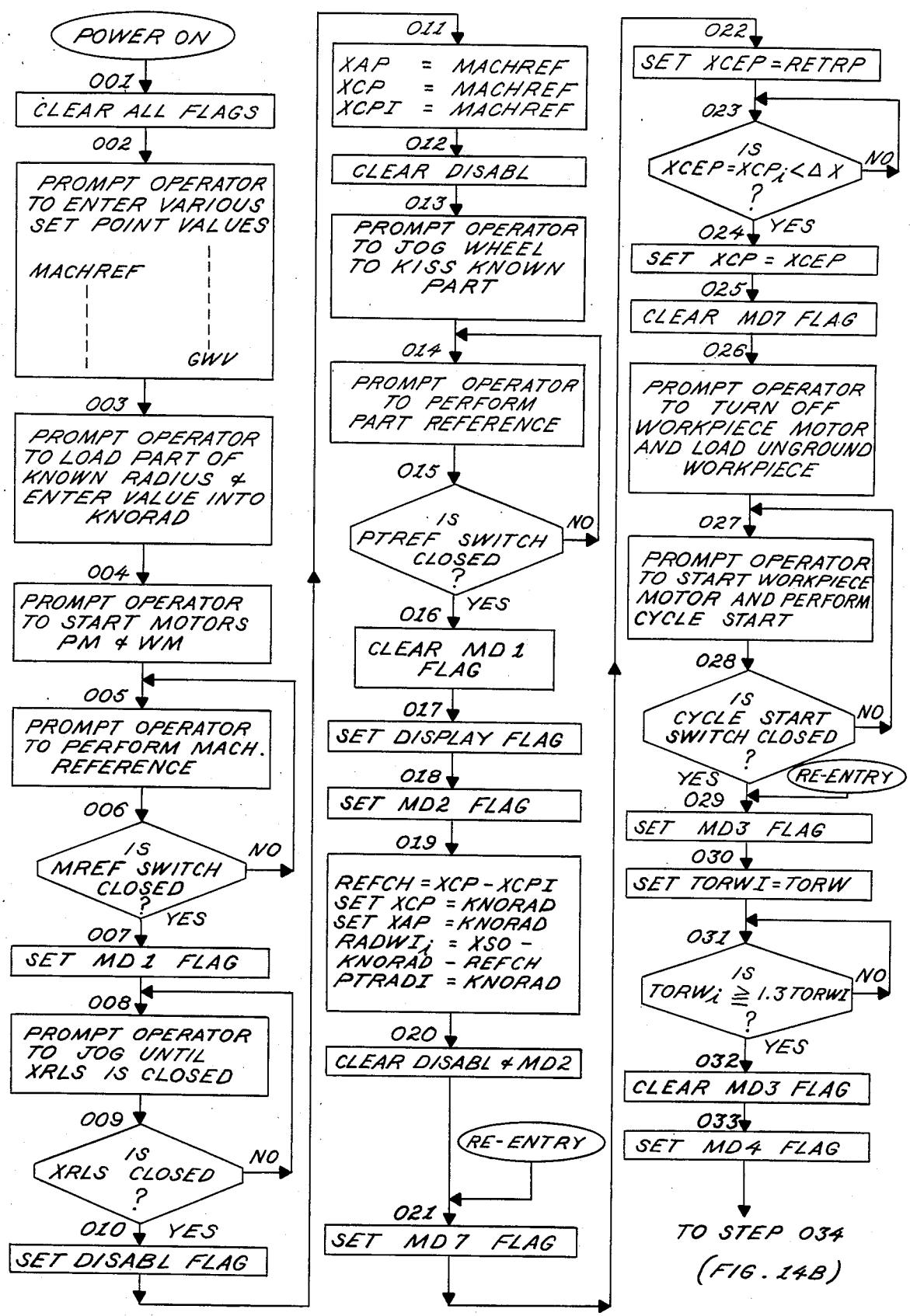
Figure 11B:
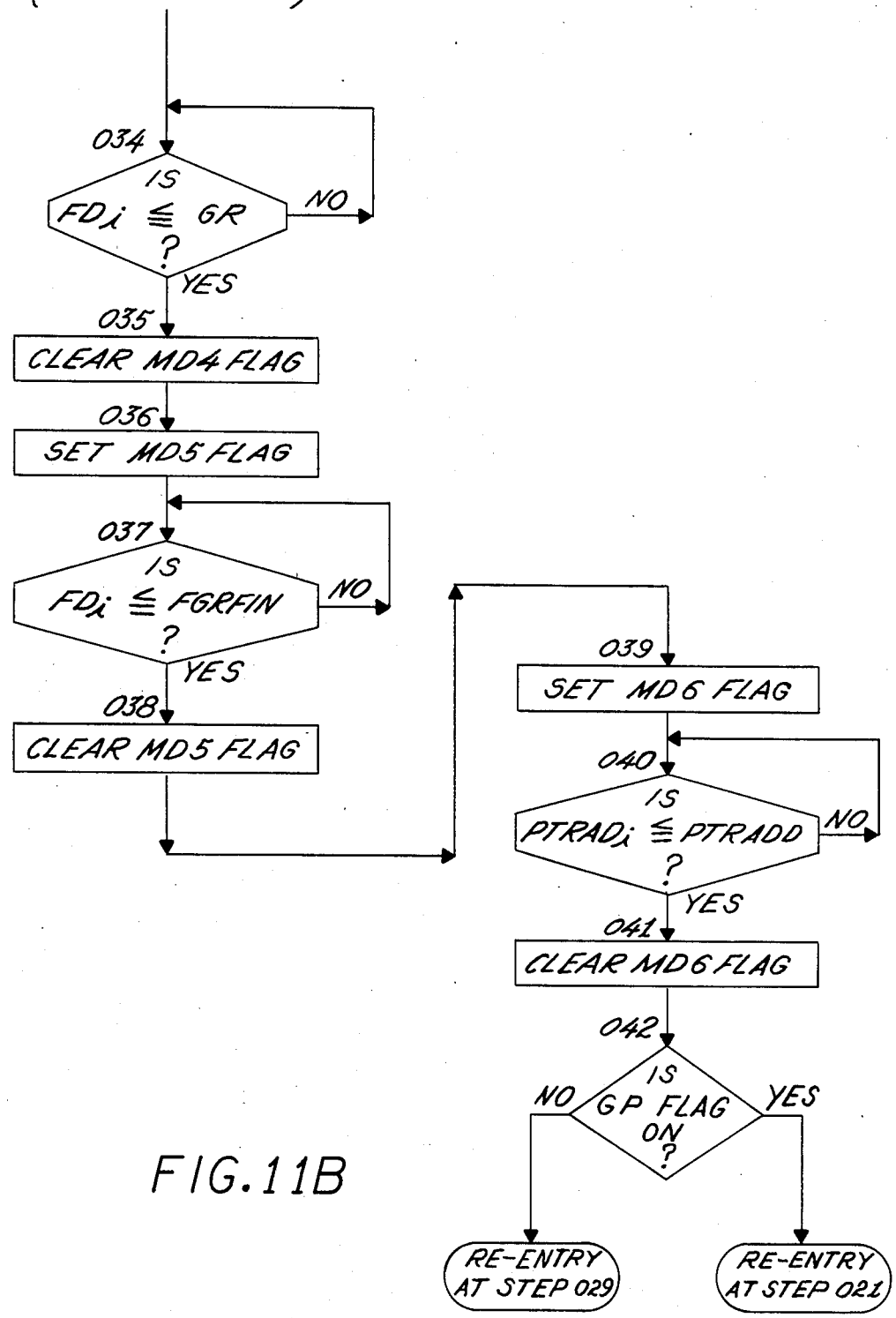
Figure 12:
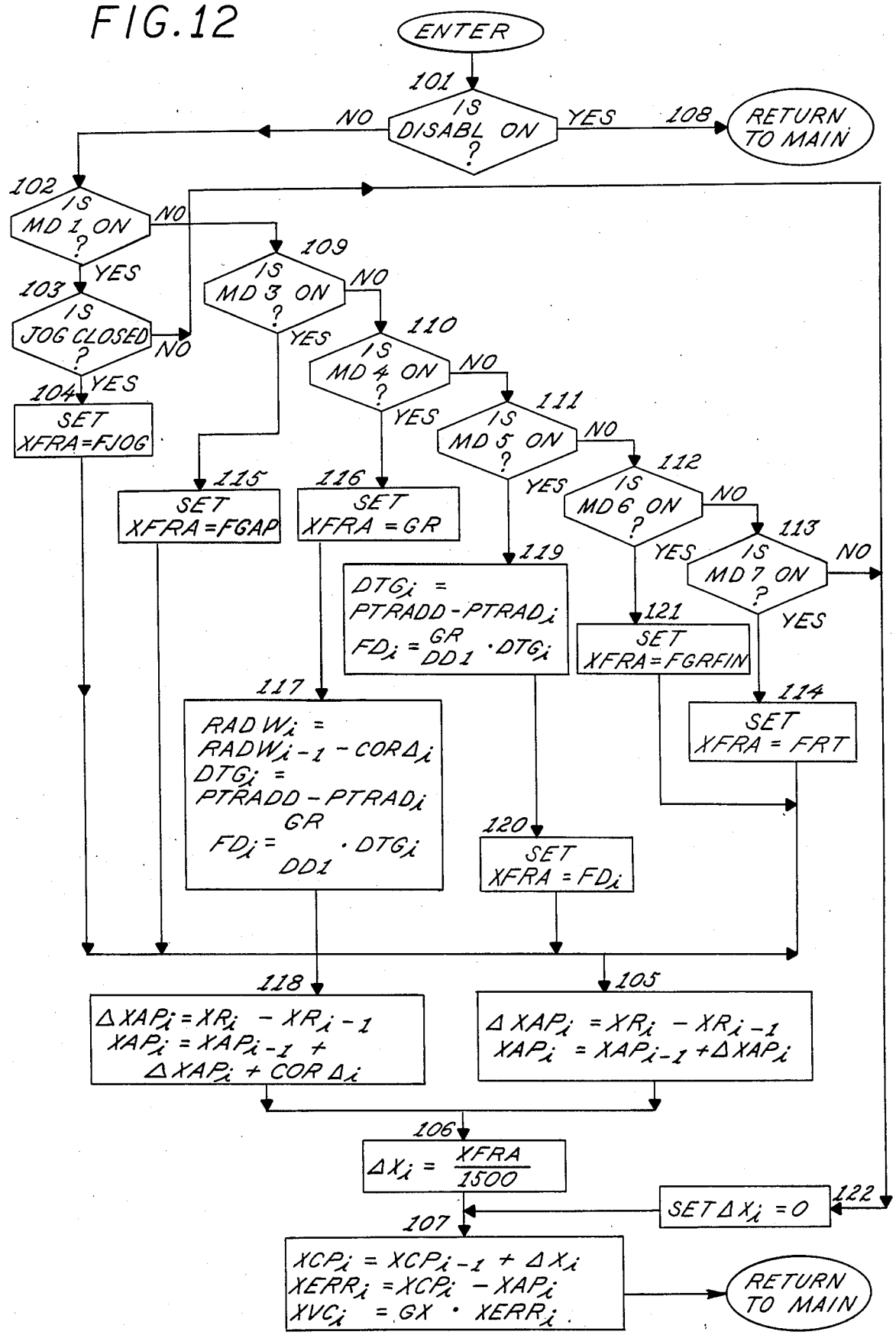
Figure 13:
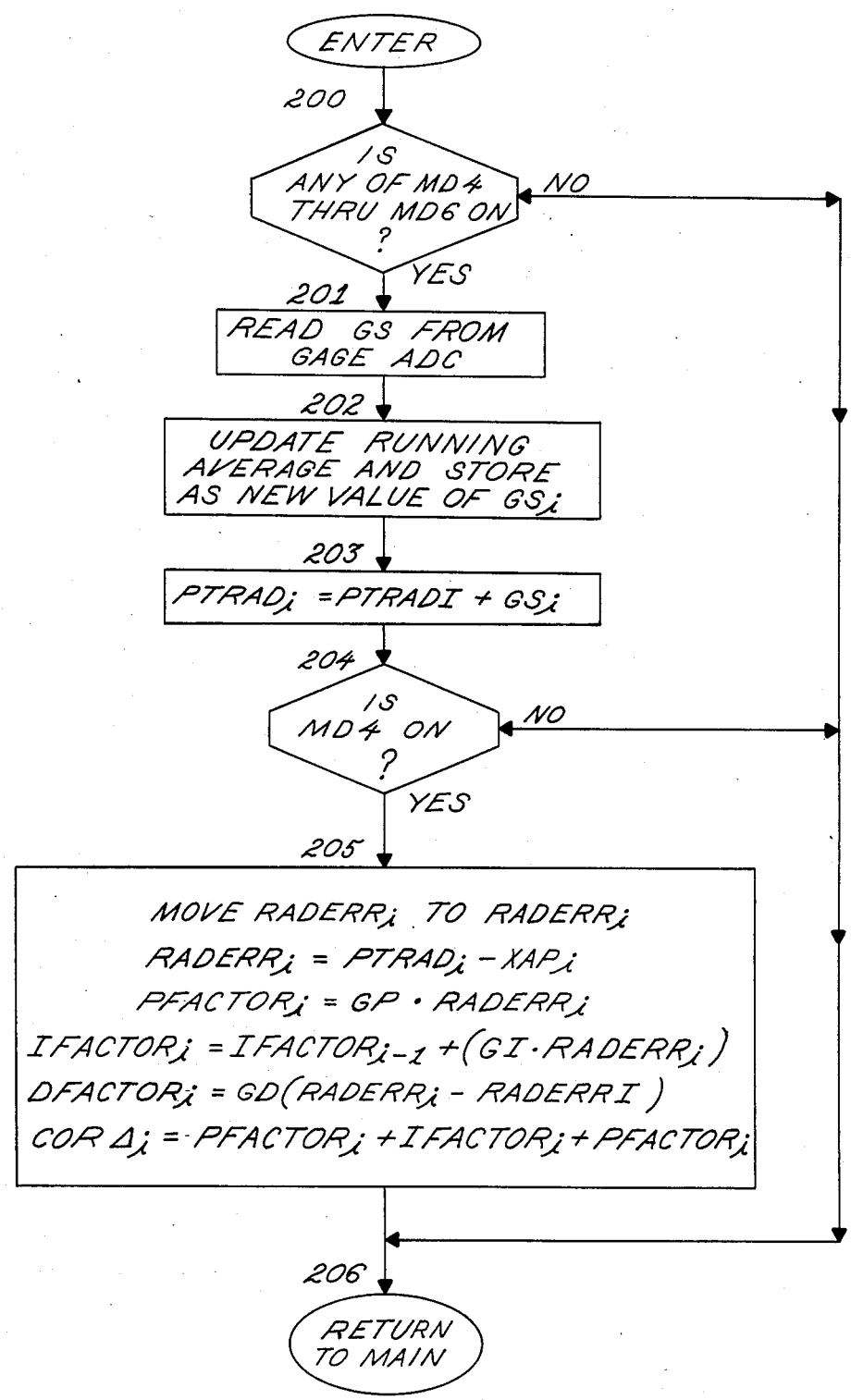
Figure 14:
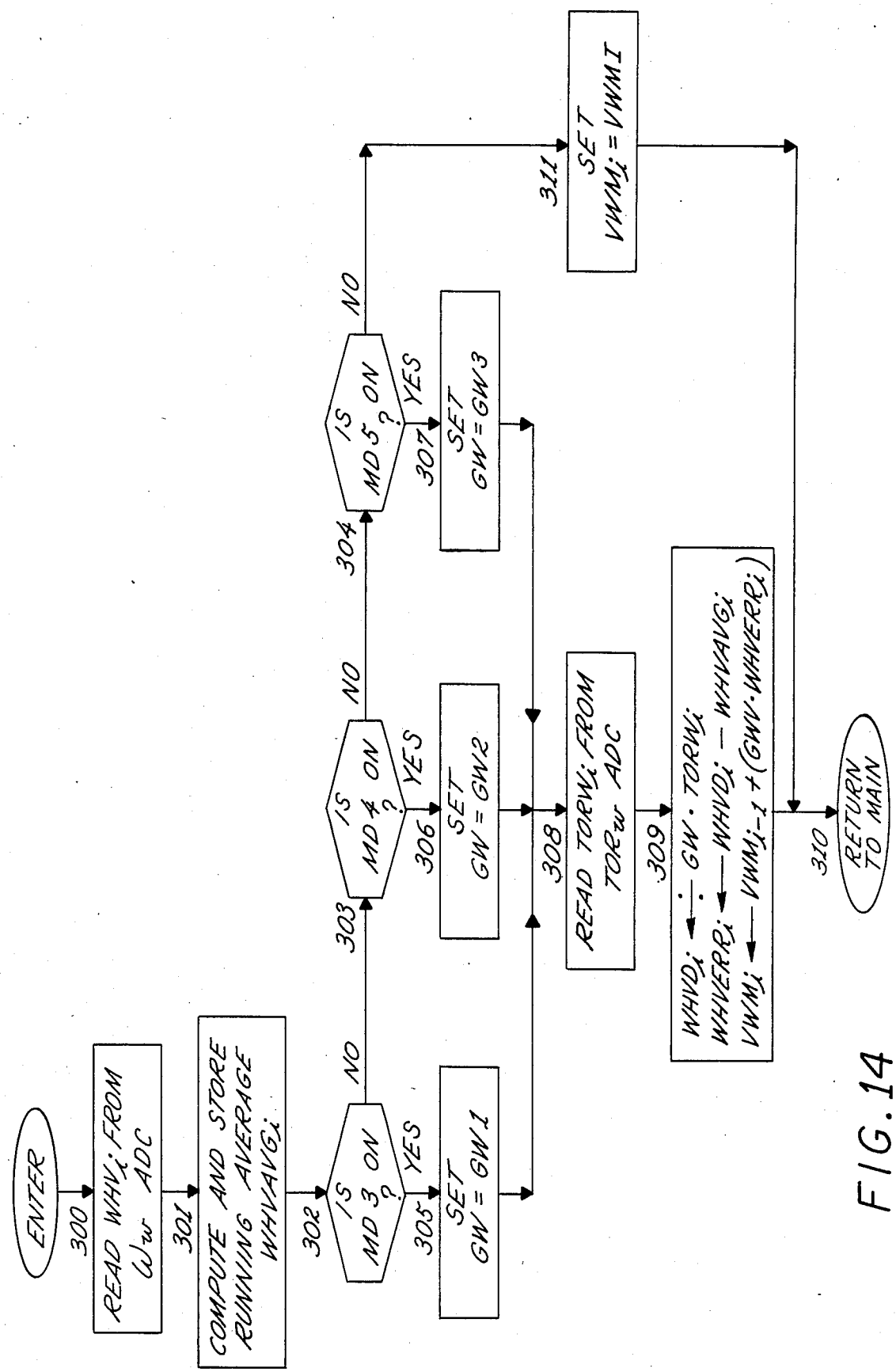
Figure 15:
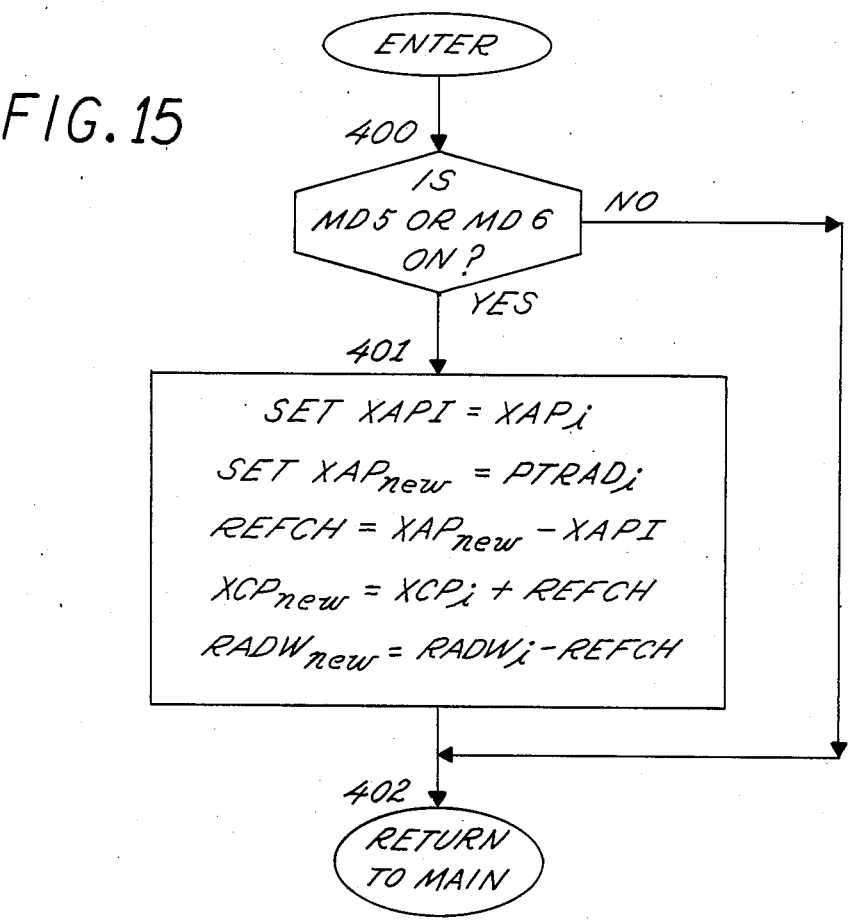
Figure 16:
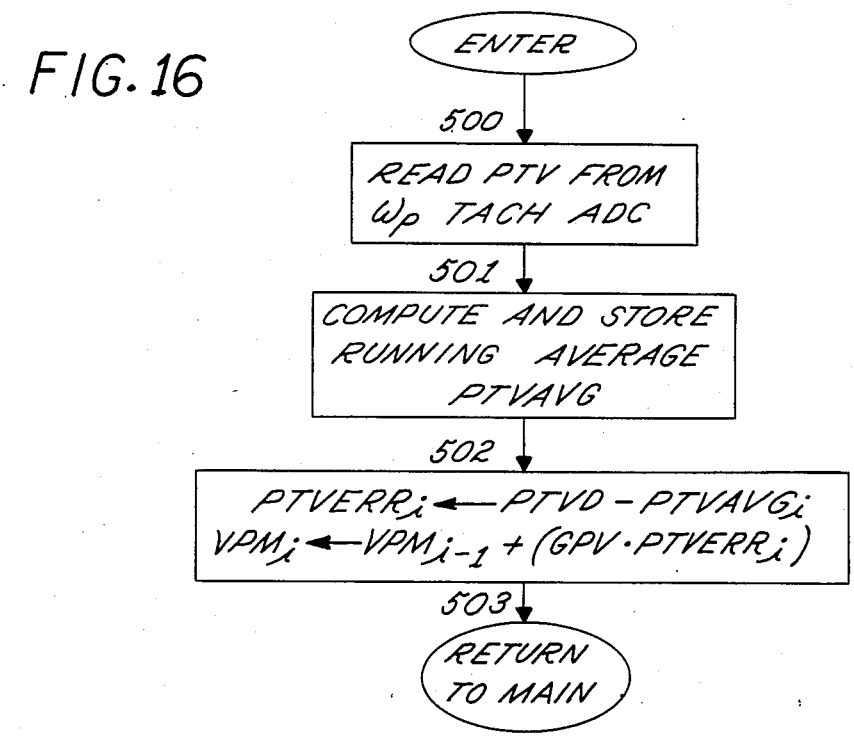
Figure 17:
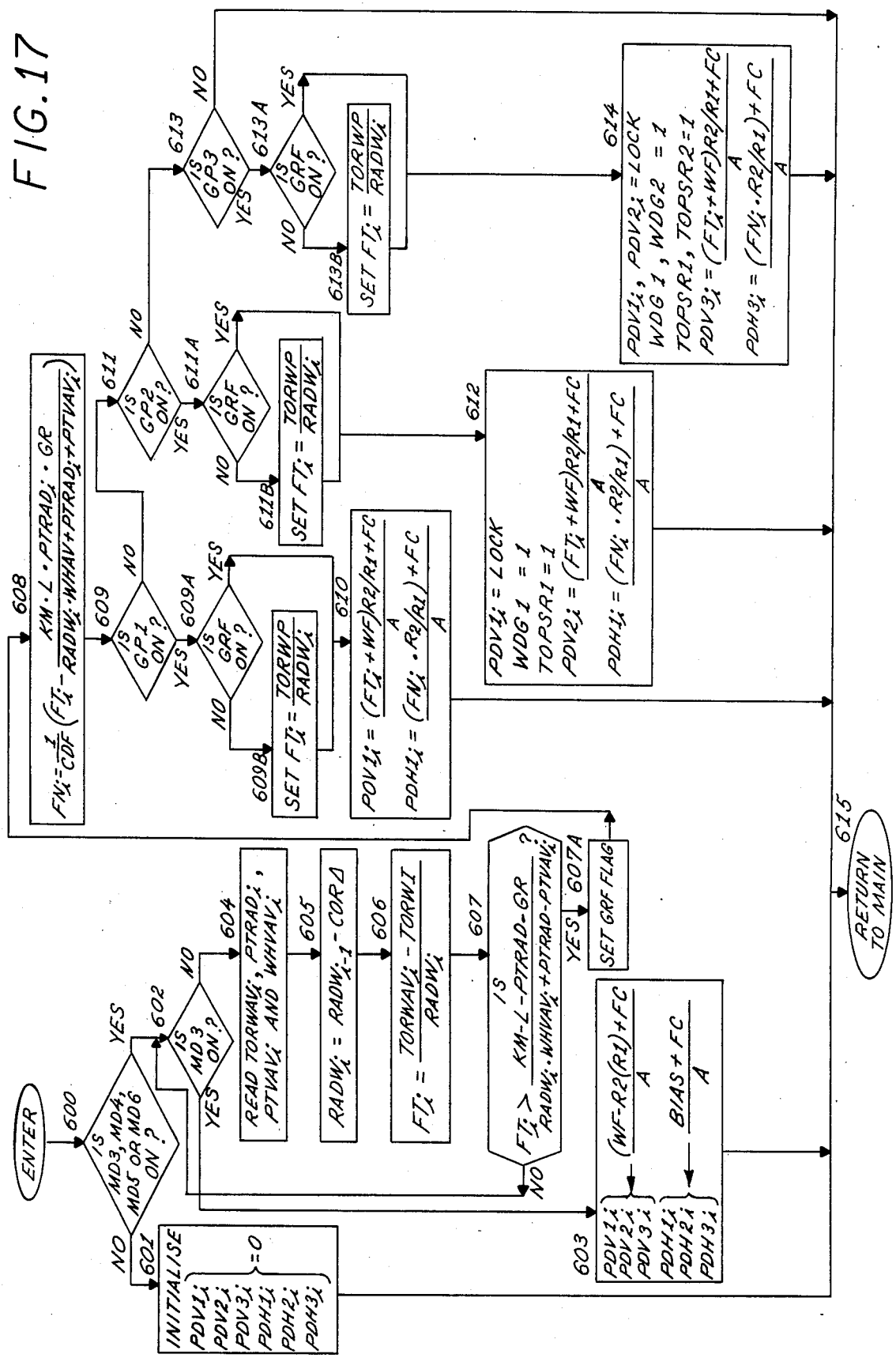

FIGS. 11A and 11B (hereinafter collectively referred to as FIG. 11) constitute a flow chart illustrating the sequences of operations carried out according to a main program stored in the memory of FIG. 10 and executed by the computer of FIG. 9 for controlling the grinding machine of FIGS. 1-7;

FIG. 12 is a flow chart illustrating the sequences of operations carried out according to a subroutine program stored in the memory of FIG. 10 and executed by the computer of FIG. 9 for controlling the wheel slide feed motor WFM in the grinding machine of FIGS. 1-7;

FIG. 13 is a flow chart illustrating the sequences of operations carried out according to a subroutine program stored in the memory of FIG. 10 and executed by the computer of FIG. 9 for performing certain operations during modes 4, 5 and 6 of the main program of FIG. 11;

FIG. 14 is a flow chart illustrating the sequences of operations carried out according to a subroutine program stored in the memory of FIG. 10 and executed by the computer of FIG. 9 for controlling the wheel drive motor WM in the grinding machine of FIGS. 1-7;

FIG. 15 is a flow chart illustrating the sequences of operations carried out according to a subroutine program stored in the memory of FIG. 10 and executed by the computer of FIG. 9 for performing certain operations during modes 5 and 6 of the main program of FIG. 11;

FIG. 16 is a flow chart illustrating the sequences of operations carried out according to a subroutine program stored in the memory of FIG. 10 and executed by the computer of FIG. 9 for controlling the workpiece drive motor PM in the grinding machine of FIGS. 1-7; and FIG. 17 is a flow chart illustrating the sequences of operations carried out according to a subroutine program stored in the memory of FIG. 10 and executed by the computer of FIG. 9 for controlling the pressure supplied to the steadyrest pistons in the grinding machine of FIGS. 1-7.

GRINDING MACHINE CONFIGURATION AND COMPONENTS

Figure 1:
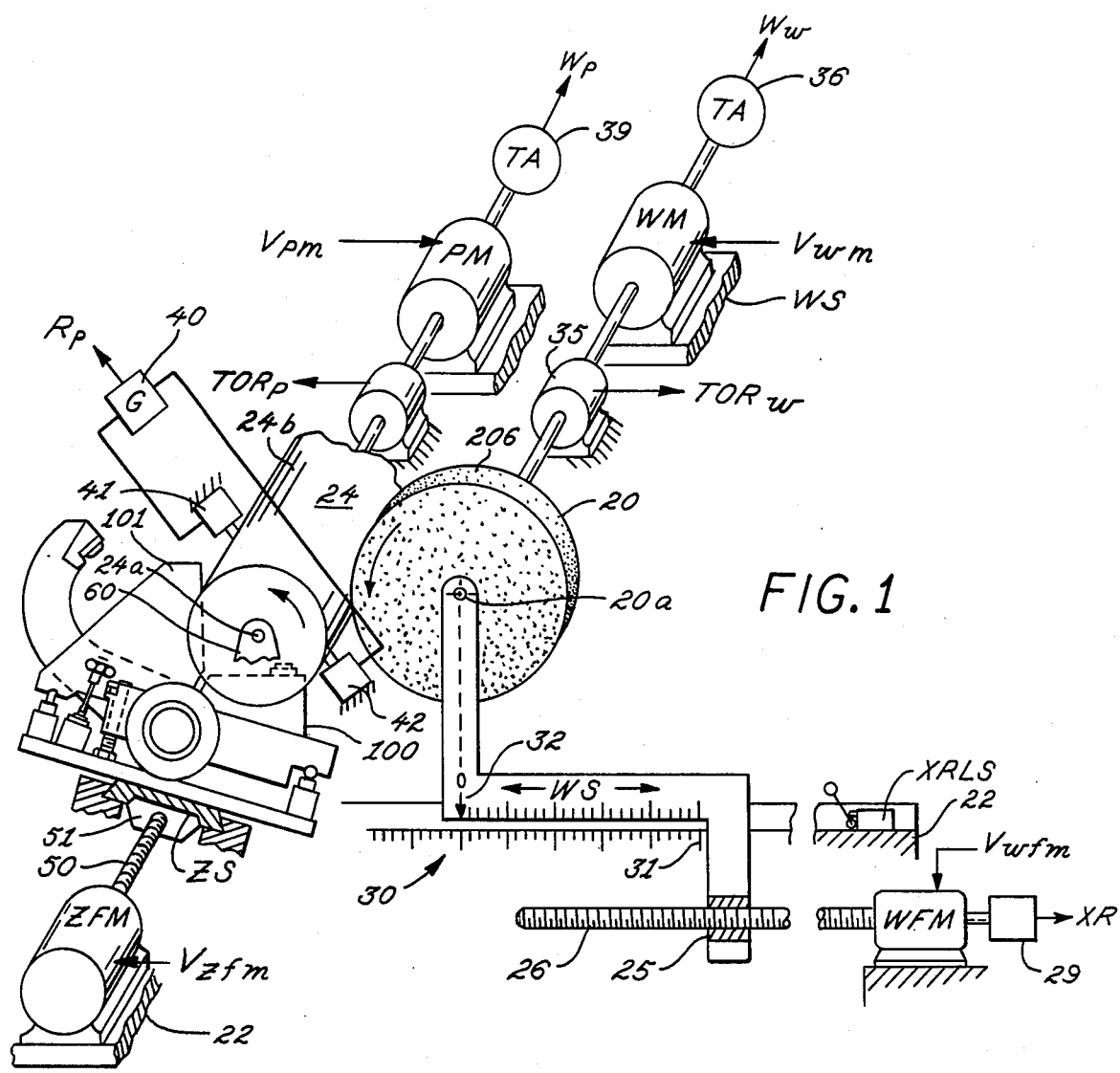
FIG. 1 is a diagrammatic illustration of an exemplary grinding machine with rotational and feed drives for the various relatively movable components, and with sensors for signaling the values of different physical parameters such as speeds, positions and torques.

FIG. 1 diagrammatically shows a grinding machine with its various relatively movable components, together with various sensors and driving motors or actuators. Not all the sensors and actuators are required in the preferred embodiment of the present invention to be described, but FIG. 1 may be taken as an "overall" figure illustrating all the various machine-mounted components which can be employed in various embodiments.

The grinding machine is here illustrated by way of example as a cylindrical grinder, but the invention to be disclosed below is equally applicable to other types of grinding machines utilizing steadyrests, such as roll grinders, etc., as well as other workpiece-shaping machines such as lathes. The machine includes a grinding wheel 20 journaled for rotation about an axis 20a and rotationally driven (here, counterclockwise) at an angular velocity $\omega_w$ by a wheel motor WM. The wheel 20 and its spindle or axis 20a are bodily carried on a wheel slide WS slidable along ways of the machine bed 22. As shown, the face 20b of the wheel is brought into relative rubbing contact with the work surface 24b of a part or workpiece 24, and the wheel face is fed relatively into the workpiece by movement of the carriage WS toward the left, to create abrasive grinding action at the work/wheel interface.

In the exemplary arrangement shown, the workpiece 24 is generally cylindrical in shape (i.e., its outer surface is a surface of revolution) and supported on a Z-axis slide ZS. The workpiece is journaled for rotation about an axis 24a and rotationally driven (here, counterclockwise) at an angular velocity $\omega_p$ by a part motor PM mounted on the slide ZS. Since the workpiece and wheel surfaces move in opposite directions at their interface, the relative surface speed of their rubbing contact is equal to the sum of the peripheral surface speeds of the two cylindrical elements.

Any appropriate controllable means may be employed to move the slide WS left or right along the bed 22, including hydraulic cylinders or hydraulic rotary motors. As here shown, however, the slide WS mounts a nut 25 engaged with a lead screw 26 connected to be reversibly driven at controllable speeds by a wheel feed motor WFM fixed on the bed. It may be assumed for purposes of discussion that the motor WFM moves the slide WS, and thus the wheel 20, to the left or right, according to the polarity of an energizing voltage $V_{wfm}$ applied to the motor, and at a feed rate or velocity proportional to the magnitude of such voltage.

A position sensor 29, which includes a conventional resolver, is coupled to the slide WS or the lead screw 26 to produce a signal XR which varies to represent the position of the wheel slide as it moves back and forth. In the present instance, the position of the wheel slide is measured along a scale 30 (fixed to the bed) as the distance between a zero reference point 31 and an index point 32 on the slide.

In the practice of the invention in certain of its embodiments, it is desirable (for a purpose to be explained) to sense and signal the power which is being applied for rotational drive of the grinding wheel 20, and also to sense and signal the rotational speed of the wheel. While power may be sensed and signaled in a variety of ways, FIG. 1 illustrates for purposes of power computation a torque transducer 35 associated with the shaft which couples the wheel motor WM to the wheel 20. The torque sensor 35 produces a dc. voltage $TOR_w$ which is proportional to the torque exerted on the wheel to produce the rubbing contact described above at the interface of the wheel 20 and the workpiece 24. The wheel motor WM is one which is controllable in speed, and while that motor may take a variety of forms such as a hydraulic motor, it is here assumed, for purposes of discussion, to be a dc. motor which operates at a rotational speed which is proportional to an applied energizing voltage $V_{wm}$. As a convenient but exemplary device for sensing and signaling the actual rotational speed of the wheel 20, a tachometer 36 is here shown as coupled to the shaft of the motor WM and producing a dc. voltage $\omega_w$ proportional to the rotational speed (e.g., in units of r.p.m.) of the wheel 20.

In similar fashion, the rotational speed of the workpiece or part 24 is signaled directly or indirectly. The rotational speed of the workpiece 24 is controllable, and in the present instance it is assumed that the motor PM drives the workpiece 24 at an angular velocity proportional to the magnitude of a dc. energizing voltage $V_{pm}$ applied to that motor. To sense the actual angular velocity of the rotationally driven workpiece 24, a tachometer 39 is coupled to the shaft of the motor PM and produces a dc. signal $\omega_p$ proportional to the workpiece speed.

Again, although not essential to the practice of the invention in all of its embodiments, FIG. 1 illustrates a typical and suitable arrangement for continuously sensing and signaling the size (i.e., radius) of the workpiece 24 as the latter is reduced in diameter due to grinding action. Such workpiece sensing devices are often called "in-process part gages". One known type of such gage is a diametral gage 40 having a pair of sensors 41 and 42 which ride lightly on the workpiece surface at diametrically spaced points. The output signal from the gage 40 is directly proportional to the distance between the tips of two sensors 41 and 42, which is the actual diameter $D_p$ of the workpiece at any given time. Since the workpiece diameter $D_p$ is twice the workpiece radius $R_p$, the gage 40 is calibrated to produce a signal $R_p$ equal or proportional to the actual workpiece radius.

In setting up a grinding system of the type illustrated in FIG. 1, the grinding wheel slide WS may be positioned initially at a known reference position fixed by a reference limit switch XRLS. When the wheel slide is in this position, the distance between the grinding wheel axis 20a and the workpiece axis 24a is a known value, and the position sensor 29 may be "calibrated" so it thereafter signals the position of the wheel slide WS as a distance from axis 24a to axis 20a.

To permit indexing movement of the workpiece 24 in a direction lengthwise of its axis, the slide ZS is movable by a Z-axis feed motor ZFM mechanically coupled to a lead screw 50 engaged with a nut 51 in the slide ZS. The motor ZFM has its stator rigidly mounted on the machine bed 22 so that as the lead screw 50 turns in one direction or the other, the slide ZS is fed to the left or right relative to the grinding wheel 20. The motor ZFM is here assumed, for simplicity, to be a dc. motor which drives the lead screw in a direction which corresponds to, and at a speed which is proportional to, the polarity and magnitude of an energizing voltage $V_{zfm}$.

The workpiece 24 is carried and journaled at its opposite extremities by spindles at the upper ends of spindle arms (one shown at 60) integral with or fastened to the slide ZS. These spindles define the "centers" on which the workpiece is rotated, i.e., the desired axis of rotation of the workpiece. A relatively long workpiece having even slight flexibility may sag downwardly due to its own weight, or may deflect due to trans-axial forces exerted by the grinding wheel at locations intermediate the workpiece centers. To support the workpiece 24 between its centers, a plurality of pairs of steadyrests 100 and 101 are spaced along the length of the workpiece. Only one such pair is illustrated in FIG. 1, but it will be understood that any desired number of steadyrest pairs may be spaced along the length of the workpiece to provide the requisite support for the workpiece. The steadyrests 100, 101 are mounted on the Z-axis slide ZS, with the steadyrest 101 located diametrically opposite the grinding interface, and the steadyrest 100 located at the lowermost region of the workpiece 24 (90° away from the grinding interface).

As can be seen in FIG. 1, a third steadyrest 102 is associated with each pair of steadyrests 100, and 101. As will be described in more detail below, this third steadyrest 102 comes into play only after sparkout at any given grinding surface, in order to stabilize the workpiece for the grinding of other surfaces thereon.

Figure 1A:
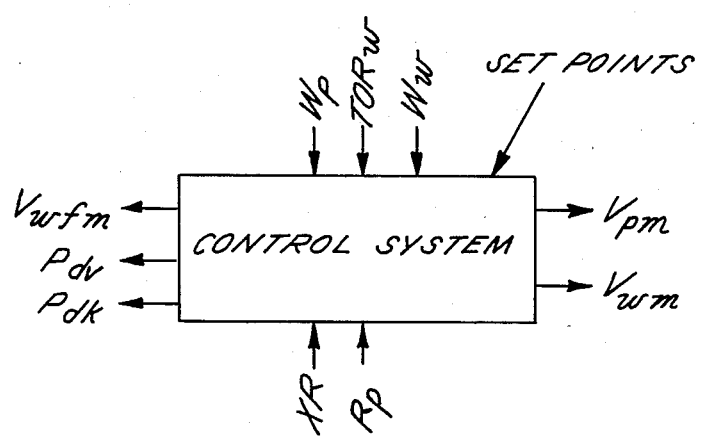
FIG. 1A is a generalized representation of a control system to be associated with the apparatus of FIG. 1 in the practice of the present invention according to any of several embodiments.

FIG. 1A is a generic block representation of a control system employed in the various embodiment of the invention to be described and which operates to carry out the inventive methods. In its most detailed form, the control system receives as inputs the signals XR, $R_p$, $TOR_w$, $\omega_p$, and $\omega_w$ produced as shown in FIG. 1; and it provides as output signals the motor energizing signals $V_{pm}$ and $V_{wm}$ which determine the respective rotational speeds of the workpiece 24 and the wheel 20, the signal $V_{wfm}$ which determines the feed rate of the wheel slide WS and signals $P_{dv}$ and $P_{dh}$ which determine the pressures supplied to the pistons (to be described below) that urge the steadyrests 100, 101 toward the workpiece. It will become apparent later that not all the sensors, and signals representing sensed physical variables, need be used in the practice of all embodiments of the invention.

DEFINITIONS AND SYMBOLS

Relative Surface Speed: The relative surface velocity with which rubbing contact occurs at the wheel face/workpiece surface interface. If the wheel surface is moving in one direction at 3000 feet per minute and the workpiece surface is moving at 1000 feet per minute in the opposite direction, the relative surface speed is 4000 feet per minute. If the workpiece surface is not moving, then the relative speed of rubbing is equal to the surface speed of the wheel face due to wheel rotation. If the workpiece surface is moving in the same direction as the wheel face, the relative surface speed is the difference between the surface velocity of the wheel face and the surface velocity of the workpiece surface.

Relative Feed: The relative bodily movement of a grinding wheel and workpiece which causes progressive interference as the relative rubbing contact continues and by which the material of the workpiece is progressively removed. It is of no consequence whether the wheel is moved bodily with the workpiece stationary (although perhaps rotating about an axis) or vice versa, or if both the wheel and workpiece are moved bodily. Feeding is expressible in units of velocity, e.g., inches per minute.

Rate of Material Removal: This refers to the volume of material removed from a workpiece (or some other component) per unit time. It has dimensional units such as cubic centimeters per second or cubic inches per minute. In the present application alphabetical symbols with a prime symbol added designate first derivatives with respect to time, and thus the symbol $M'$ represents volumetric rate of removal of material from a workpiece. In similar fashion, the symbol $W'$ represents the volumetric rate of removal of material from a grinding wheel.

The following symbols designate physical variables which have been referred to in the introductory discussion above and/or will be referred to in the more detailed discussion to follow:

$A$ = area of the face of the steadyrest piston to which the pressure P is applied.

$C_f$ = coefficient of friction for the frictional rubbing of the wheel and workpiece at the grinding interface.

$D_p$ = diameter of workpiece.

$F$ = force applied to a workpiece due to relative infeeding of a grinding wheel with relative rubbing contact of the wheel face and the workpiece surface.

$F'$ = the reactive force applied to a grinding wheel as a result of a force F.

$F_c$ = counter force exerted on steadyrest piston by return spring.

$F_N$ = the portion of the force F that is normal to a line tangent to the workpiece surface at the grinding interface.

$F_{Nh}$ = the horizontal component of a force $F_N$ that is not horizontal.

$F_{Nv}$ = the vertical component of a force $F_N$ that is not horizontal.

$F_p$ = the force exerted on a steadyrest by a piston due to hydraulic pressure on the piston.

$F_S$ = force exerted on workpiece by steadyrest.

$F_{Sh}$ = the horizontal force exerted on workpiece by steadyrest.

$F_{Sv}$ = the vertical force exerted on workpiece by steadyrest.

$F_T$ = the portion of the force F that is tangential to the workpiece surface at the grinding interface.

$F_{Tf}$ = the portion of the force $F_T$ that causes generation of heat by rubbing friction.

$F_{Tmr}$ = the portion of the force $F_T$ that is devoted to removal of material at the grinding interface.

$F_{wf}$ = force component exerted on workpiece by steadyrest to counterbalance force WF due to weight of workpiece.

$F_{ws}$ = feed rate (velocity) of wheel slide $K_m$ = material removal work function constant.

$L$ = axial length of wheel face or region of grinding contact.

$M'$ = the volumetric rate of removal of material (metal) from the part being ground. Exemplary units: cubic inches per min.

$P$ = pressure applied to the steadyrest piston to produce the force $F_S$.

$POS_{ws}$ = position of wheel slide along the workpiece axis.

$PWR_f$ = portion of the power $PWR_t$ creating heat due to friction.

$PWR_{mr}$ = portion of the power $PWR_t$ devoted to removing material at the grinding interface.

$PWR_t$ = total power input to the grinding interface.

$R1$ = radial distance from steadyrest pivot axis to point at which piston force is applied to steadyrest.

$R2$ = radial distance from steadyrest pivot axis to point at which steadyrest force is applied to workpiece.

$R'_p$ = rate of radius reduction of workpiece.

$R_p$ = radius of workpiece.

$R_w$ = radius of grinding wheel.

$S_p$ = the surface speed of the workpiece.

$S_r$ = the relative surface speed at the grinding interface.

$S_w$ = the surface speed of the grinding wheel.

$TOR_w$ = torque exerted to drive the grinding wheel.

$V_{pm}$ = voltage applied to the workpiece drive motor PM.

$V_{wfm}$ = voltage applied to the wheel slide feed motor WFM.

$V_{wm}$ = voltage applied to the wheel drive motor WM.

$V_{zfm}$ = voltage applied to the Z-axis feed motor ZFM.

WF = the force of weight of a workpiece that tends to sag or bow downwardly in its axially intermediate regions.

XR = resolver signal indicating actual position of wheel slide $\omega_p$ = rotational speed of workpiece, i.e., the part to be ground.

$\omega_w$ = rotational speed of grinding wheel.

NOTE: Any of the foregoing symbols with an added "d" subscript represents a "desired" or set point value for the corresponding variable. For example, $\omega_{wd}$ represents a commanded or set point value for the rotational speed of the wheel. Similarly, any of the foregoing symbols with an added "o" subscript represents an original or initial value for the corresponding variable.

Certain ones of the foregoing symbols will be explained more fully as the description proceeds.

Forces At The Grinding Interface And Compensation According To The Invention

Figure 2:
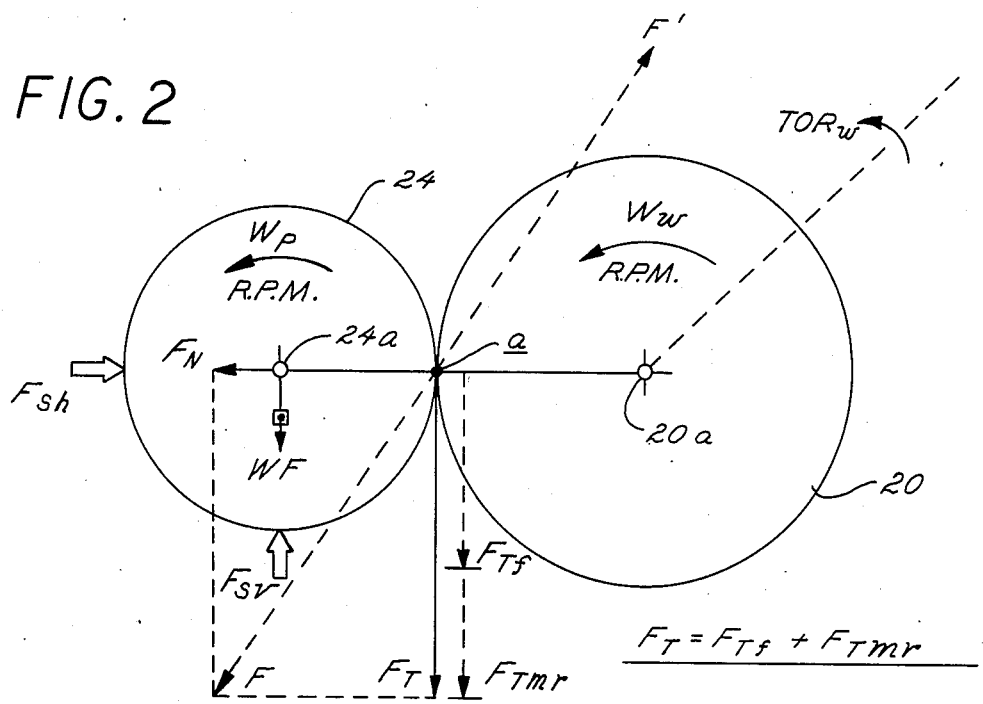
FIG. 2 is a diagrammatic illustration of a grinding wheel and workpiece being relatively infed bodily with their surfaces in rubbing contact, and illustrating various forces exerted on the wheel and the workpiece.

As an aid to understanding the present invention, FIG. 2 very diagrammatically illustrates the wheel 20 and the workpiece 24 being relatively infed bodily and with their surfaces in relative rubbing contact. The relative infeeding of the wheel and the workpiece produces the interference which effects grinding at the interface region a. As a necessary incident to this grinding action, a force F is applied to the part 24 from the wheel 20, and an equal, opposite reactive force F' is applied from the part 24 to the wheel 20. The force F tends to deform or deflect the workpiece 24 along with its supporting steadyrests and centers and even the wheel slide. Because of this deflection, grinding starts slowly after initial engagement of the wheel and workpiece and reaches a maximum rate only when equilibrium has been established in the entire system, i.e., when all the components have deflected to the point that each applied force has an equal and opposite reactive force. As mentioned previously however, the applied forces do not remain constant in a grinding operation, but rather are subject to a variety of different and frequent changes, even during a single revolution of the workpiece.

For example, a relatively long, rod-like workpiece supported on centers but engaged by the grinding wheel to grind a bearing surface at the lengthwise midregion, will tend to deflect or bow somewhat like a resilient beam. This can in some cases tend to fatigue or permanently deform the workpiece; more importantly, it creates what is called "springback" with attendant control problems to bring the ground bearing surface precisely to the desired final diameter, concentricity and roundness. In extreme cases, bowing of the workpiece is accompanied by periodic "snap-back" circumferentially of the workpiece which is observed as what is commonly called chatter. Chatter is to be avoided because it produces high wheel wear rates and imperfect grinding. The grinding and reaction forces can also fluctuate due to variations in the compliance of certain workpieces, such as crankshafts, during each revolution; these variations continue throughout the entire grinding operation. As described previously, the force F can also vary during each revolution of the workpiece when grinding a workpiece whose surface is eccentric relative to the axis of rotation of the workpiece (this axis of rotation is normally the same axis as that used when the ground part is put into service).

The force F may be viewed as resolved into two vector components $F_T$ and $F_N$ which respectively lie (i) tangential to the wheel face at the grinding interface point a and (ii) normal to the wheel surface at the point a. The normal force $F_N$ lies along a line extending radially from the wheel axis 20a to the grinding contact point a, and the tangential force $F_T$ is at right angles to such line. Where, as in the example of FIG. 2, the part 24 is cylindrical and the part and wheel axes 20a, 24a lie on a horizontal line, the force $F_T$ is vertical and the force $F_N$ is horizontal.

In accordance with the present invention, the forces $F_T$ and $F_N$ are determined directly or indirectly. For example, force transducers may be mounted in association with the bearings which journal the wheel spindle in the wheel slide, such force transducers being organized to produce electrical signals which, directly or by computational processing, are proportional to the magnitudes of the tangential and normal forces $F_T$ and $F_N$. It need hardly be mentioned that such forces will vary in magnitude and in relation to one another as grinding conditions (e.g., controlled conditions such as wheel dullness, wheel speed, infeed rate, etc. as well as the uncontrolled system conditions described above) change.

As a second procedure according to the invention, counterbalancing forces are applied to the workpiece which in net effect are equal and opposite to the force F at the axial location on the workpiece where the wheel is actively grinding. Stated another way, since the force F is made up of its tangential and normal components $F_T$ and $F_N$, counterbalancing forces are applied to the workpiece which vary to produce the net effect of cancelling the changeable forces $F_T$ and $F_N$.

As explained more fully with reference to subsequent drawing figures and one preferred embodiment, the steadyrests 100 and 101 are disposed to engage the workpiece and to apply controllable forces $F_{Sv}$ and $F_{Sh}$ which are equal and opposite to the signaled magnitudes of the forces $F_T$ and $F_N$, respectively. In the preferred form, each of the steadyrests 100, and 101 includes a pad slidingly engaged with the work surface and urged against the workpiece by a hydraulic piston. Fluid pressure applied behind the piston is controlled by a servo mechanism such that the forces $F_{Sv}$ and $F_{Sh}$ are kept dynamically in agreement with the signaled, changing values of the respective forces $F_T$ and $F_N$. The vector resultant of the forces $F_{Sv}$ and $F_{Sh}$ thus is equal and opposite to the force F at all times (except for prebending and sag compensation, to be explained) so the workpiece is prevented from deflecting or deforming. Because hydraulic pressure creates the steadyrest forces $F_{Sv}$ and $F_{Sh}$, the steadyrest pads and pistons may be permitted to move both toward and away from the axis of rotation of the workpiece, even during a single revolution of the workpiece. Thus, the steadyrest pads and pistons "float" or "follow" in continuous contact with the workpiece surface, even if it is initially eccentric in relation to the workpiece axis of rotation.

When a long, generally cylindrical workpiece is supported at its ends with its axis disposed horizontally, it may tend to sag or bow downwardly in its axially intermediate regions due simply to its own weight. Generally speaking the sag will be greater at greater axial distances from a point of support. This effective force of weight of the workpiece is labeled WF in FIG. 2. If sag is more than negligible, one may optionally compensate for it by controlling the hydraulically produced steadyrest force $F_{Sy}$ to be equal to $F_T$ plus WF. The workpiece axis is thus kept straight and unbowed. The magnitude of the force WF is easily determined when the workpiece is initially placed and set up in the grinding machine. It is only necessary, prior to grinding, to apply and adjust a force via the lower steadyrest to raise the workpiece axis to measured coincidence with the axis defined by the machine spindles; the force value WF is the force so determined.

There are various types of apparatus and procedures for dynamically determining and signalling, more or less continuously, the magnitudes of the variable forces $F_T$ and $F_N$ while grinding is in progress. The use of force transducers associated with the wheel spindle bearings is not ideal due to expense and lack of accuracy. In a preferred embodiment of the method and apparatus of the present invention, the forces $F_T$ and $F_N$ are determined and signaled from measured values of other parameters such as wheel torque, wheel speed, and part and wheel radii. These various signals are available anyway in certain grinding control systems such as that disclosed and claimed in the patent application Ser. No. 445,689. In the preferred embodiment of the invention, the values of the forces $F_T$ and $F_N$ are determined in the manner now to be described, but it is to be understood that the invention in its broadest aspects is not limited to the details of the preferred embodiment.

When grinding is taking place (as generally represented in FIG. 2) power is fed into the grinding interface by the wheel drive motor WM (and, in the example of FIG. 1, by the workpiece drive motor PM). This total power $PWR_t$ (rate of energy input to the grinding interface) is simply the tangential force $F_T$ multiplied by the distance per unit time through which that force acts. The distance per unit time is expressible as the relative surface feet per minute (RSFM, here called $S_r$) of the rubbing contact at the grinding interface. One may thus write:

$$S_w = 2\pi \times R_w \times \omega_w \quad (1)$$

$$S_p = 2\pi \times R_p \times \omega_p \quad (2)$$

$$S_r = S_w + S_p = 2\pi(R_w \times \omega_w + R_p \times \omega_p) \quad (3)$$

where $S_w$ is the surface speed of the wheel, $R_w$ is the radius of the wheel, $S_p$ is the surface speed of the workpiece, and $R_p$ is the radius of the workpiece.

The tangential force $F_T$ multiplied by the wheel radius $R_w$ is equal to the wheel-driving torque $TOR_w$ signaled by the transducer 35 in FIG. 1. Thus:

$$F_T = \frac{TOR_w}{R_w} \quad (4)$$

The wheel radius $R_w$ is easily found, on a continuous basis despite any wheel wear, from the transducers shown in FIG. 1. It is apparent that if the slide position sensor 29 is set up such that a signal $POS_{ws}$ dynamically represents the position (distance) of the zero mark 32 from the workpiece axis 24a; then:

$$R_w = POS_{ws} - R_p \quad (5)$$

where $R_p$ is the part radius signal from the gage 40. Thus, with the torque transducer 35 and the position sensor 29, Equation (4) is readily usable to produce a signal $F_T$ which continuously represents the variable tangential force.

The counterbalancing force $F_{Sv}$ is thus readily created by a hydraulic steadyrest associated with a closed servo loop whose set point or input command is set to produce the desired output force $F_{Svd}$ equal to the tangential force $F_T$, namely:

$$F_{Svd} = F_T = \frac{TOR_w}{R_w} = \frac{TOR_w}{POS_{ws} - R_p} \quad (6)$$

or, more preferably:

$$F_{Svd} = F_T + WF = \frac{TOR_w}{R_w} + WF \quad (6a)$$

The determination of the normal force $F_N$ is not quite so direct. I have discovered that $F_N$ may be derived and continuously signaled by using the tangential force $F_T$ as a starting basis if one recognizes that the total power going into the grinding interface has two distinct portions each with a separate effect. First, the power (rate of energy input) is in part converted into heat at some rate expressible in units such as BTU per minute—such heat being generated as a result of frictional rubbing of the wheel face and the workpiece surface. Secondly, the power going into the interface is in part devoted to the work of removing material (usually metal) from the workpiece, overcoming the "material removal work function". For most all workpiece materials (usually carbon steels), material removal work function constants, here called $K_m$, are readily found by grinding tests. The constant $K_m$ for any given workpiece material represents the energy required to remove a unit volume of material and is expressible, for example, in foot-pounds per cubic inch.

The tangential force $F_T$ acts through a distance equal to the relative surface speed $S_r$ over the span of one minute; thus the total energy taken up per minute (power) is expressible as total power going into the interface:

$$PWR_t = F_T \times S_4 \text{ in ft-lbs./min.} \quad (7)$$

The power fed into the interface produces the two distinct effects noted above. The first portion of that total power is transformed into heat and carried away due to natural or induced cooling; the second, remainder portion is transformed into a change of the physical state of the workpiece, that is, the second portion goes to removing material from the workpiece (and, to a lesser, negligible extent, from the wheel). The two portions collectively equal total power:

$$PWR_t = PWR_f + PWR_{mr} \quad (8)$$

where $PWR_f$ represents power devoted to creating heat due to friction and $PWR_{mr}$ represents power devoted to removing material from the workpiece. The power devoted to friction heat is expressible:

$$PWR_f = F_{Tf} \times S_r \quad (9)$$

where $F_{Tf}$ is the frictional component of the tangential force $F_T$. The power devoted to material removal is expressible in terms of the rate of removal of material:

$$PWR_{mr} = K_m \times M' \quad (10)$$

where $K_m$ is the material removal work function constant expressed in units of energy per unit volume removed, and $M'$ is the actual volumetric rate of removal of material from the workpiece expressed in units of cubic inches per minute.

It will be seen from the dashed vectors in FIG. 2 that:

$$F_T = F_{Tf} \times F_{Tmr} \tag{11}$$

so that the total power may be viewed as energy per unit time to create the two separate effects of a first force $F_{Tf}$ associated with rubbing friction and a second force $F_{Tmr}$ associated with material removal. The difficulty is that the individual values of $F_{Tf}$ and $F_{Tmr}$ (which add up to $F_T$) are not directly known or measurable. Equation (8) gives relationships by which the value of $F_{Tf}$ may be determined, as will now be explained.

The total power $PWR_t$ is:

$$PWR_t = F_T \times S_r \tag{7}$$

where the value of $F_T$ is obtained from Equation (4) and the value of $S_r$ is obtained from Equation (3).

The frictional power $PWR_f$ is:

$$PWR_f = F_{Tf} \times S_r = F_{Tf} \times 2\pi (R_W \times \omega_w + R_p \times \omega_p) \tag{12}$$

The material removal power $PWR_{mr}$ is expressed by Equation (10), where the constant $K_m$ has been previously established and is known.

By combining Equations (7), (10) and (12) into (8), one may write:

$$PWR_f = PWR_t - PWR_{mr} \tag{8a}$$

$$F_{Tf} \times S_r = F_T \times S_r - K_m \times M' \tag{13}$$

Considering that the rate of reduction in the part radius $R_p$ is known as a rate $R'_p$ expressible in inches per minute, then it is apparent that:

$$M' = 2\pi \times L \times R_p \times R'_p \tag{14}$$

where $R_p$ is the signal from the gage 40, $R'_p$ is the first derivative of that signal obtained by any suitable differentiating device or procedure, and L is the axial length of the grinding interface.

Equation (13) may be solved to arrive at:

$$F_{Tf} = F_T - \frac{K_m \times M'}{S_r} = F_T - \frac{K_m \times L \times R_p \times R'_p}{R_w \times \omega_w + R_p \times \omega_p} \tag{15}$$

All the values in the right side of Equation (15) are known. $K_m$ is a predetermined constant. L is the measured axial length of the grinding interface and its value remains constant. $F_T$ comes from Equation (4). $R_w$ comes from Equation (5). $R_p$ comes from the gage 40, and $R'_p$ is created by taking the derivative of the gage signal. $\omega_w$ and $\omega_p$ come from the respective tachometers in FIG. 1 or similar speed sensors. Thus, the value of $F_{Tf}$ is readily ascertainable.

The coefficient of friction $C_f$ for the frictional rubbing of the wheel and workpiece is available or readily determined by a simple grinding test. It represents the ratio of the force in the direction of sliding to the force normal to the direction of sliding. Thus, as is well known per se:

$$C_f = \frac{F_{Tf}}{F_N} ; F_N = \frac{F_{Tf}}{C_f} \tag{16}$$

Once $F_{Tf}$ is determined from Equation (15), therefore, the value of the normal force $F_N$ is easily found:

$$F_N = \frac{F_{Tf}}{C_f} = \frac{1}{C_f} \left[ F_T - \frac{K_m \times L \times R_p \times R'_p}{R_w \times \omega_w + R_p \times \omega_p} \right] = F_{Shd} \tag{17}$$

The resulting value of $F_{Shd}$ determined from Equation (17) is used as a set point to control the steadyrest at the left side of the workpiece 24 (FIG. 2) to maintain the force $F_{Sh}$ equal to the normal force $F_N$—so that the counterbalancing forces $F_{Sh}$ and $F_{Sv}$ respectively cancel the forces $F_N$ and $F_T$ (and, optionally, the sag force WF) Consequently, the workpiece does not deflect or deform during the course of the grinding operation.

Figure 3:
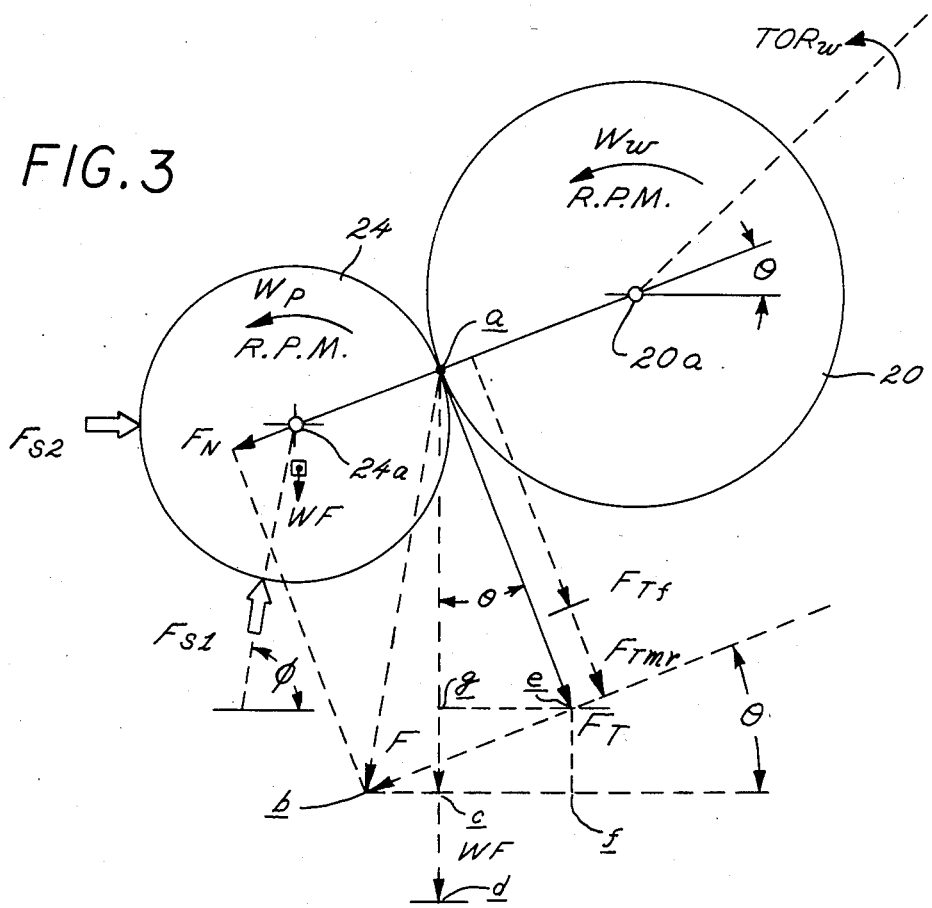
FIG. 3 is a diagrammatic illustration similar to FIG. 2 but with the workpiece and the forces exerted thereon having a different geometric relationship to the grinding wheel.

In FIG. 2, the tangential and normal forces are in vertical and horizontal directions because the axes of the wheel and workpiece lie along a horizontal line. Conveniently, the steadyrest forces $F_{Sv}$ and $F_{Sh}$ are also in vertical and horizontal directions. But the invention may be practiced with other spatial relationships for either (i) the wheel and the workpiece or (ii) the two steadyrests and the forces they create. FIG. 3 is another example chosen simply to make clear the generic character of apparatus and methods for carrying out the present invention. As there shown, the axes for the wheel and the workpiece lie on a line disposed at an angle $\theta$ from the horizontal. The lower steadyrest and its force $F_{S1}$ are disposed at an angle $\theta$ from the horizontal, while the upper steadyrest is (as in FIG. 2) disposed to make its force $F_{S2}$ act in a horizontal direction.

One sees from FIG. 3 that the line ab represents the vector sum of the forces $F_T$ and $F_N$. Such vector sum is resolvable into its horizontal and vertical components represented by lines cb and ac, respectively. If the magnitude of the weight force WF is represented by the vector line cd, then the total vertically downward force (due to grinding plus workpiece weight) is represented by the sum of the vector lines ac and cd.

In such an arrangement, the tangential force $F_T$ is determined from Equation (4), as described above, and the force $F_N$ is determined by "power proportioning" from Equation (17), as previously explained. The two steadyrest forces $F_{S1}$ and $F_{S2}$ are to be controlled in magnitude such that they cancel $F_N$, $F_T$ and WF (the latter being represented by vector cd). For this purpose, the vertical and horizontal components $F_{Nv}$ and $F_{Nh}$ of the force $F_N$ are computed from:

$$F_{Nv} = F_N \sin \theta = \text{vector ef} = gc \tag{18}$$

$$F_{Nh} = F_N \cos \theta = \text{vector bf} \tag{19}$$

The vertical and horizontal components of the force $F_T$ are computed from:

$$F_{Tv} = F_T \cos \theta = \text{vector ag} \tag{20}$$

$$F_{Th} = F_T \sin \theta = \text{vector eg} \tag{21}$$

The total $F_V$ of the three vertical force components is therefore:

$$F_V = F_{Nv} + F_{Tv} + WF = F_N \sin \theta + F_T \cos \theta + WF \tag{22}$$

$$F_V = \text{vectors } ag + gc + cd = ad \quad (22a)$$

To counterbalance all the vertical force components, the vertical component $F_{S1v}$ of the steadyrest force $F_{S1}$ is made equal to the total vertical force $F_V$, that is:

$$F_{S1v} = F_{S1} \sin \phi = F_V \quad (23)$$

Equation (23) can then be used to solve for $F_{S1}$, as follows:

$$F_{S1} = \frac{F_V}{\sin\phi} = \frac{F_N \sin\theta + F_T \cos\theta + WF}{\sin\phi} \quad (23a)$$

With the manitude of the force $F_{S1}$ thus determined, its horizontal component becomes determinable from:

$$F_{S1h} = F_{S1} \cos\phi \quad (24)$$

Now, the sum of the horizontal steadyrest force $F_{S2}$ plus the horizontal component $F_{S1h}$ of the force $F_{S1}$ is made to cancel the algebraic sum of the horizontal components of the forces $F_T$ and $F_N$. The relationship is:

$$F_{S2} + F_{S1h} = F_{Nh} - F_{Th} \quad (25)$$

By substitution from Equations (19), (21) and (24), this becomes:

$$F_{S2} = F_N \cos\theta - F_T \sin\theta - F_{S1} \cos\theta \quad (26)$$

$$F_{S2} = F_N \cos\theta + F_T \sin\theta - \frac{1}{\tan\phi} \quad (26a)$$

$$(F_N \sin\theta + F_T \cos\theta + WF)$$

It will be seen from the foregoing if spatial relationships involving known angles $\theta$ and $\phi$ in FIG. 3 are chosen, then the first steadyrest is controlled with a servo which receives an input command $F_{S1d}$ equal to $F_{S1}$ as determined from Equation (23a), and the second steadyrest is controlled with a servo which receives an input command $F_{S2d}$ equal to $F_{S2}$ as determined from Equation (26a). In this fashion, the net effect of the steadyrest forces is to cancel the forces F and WF—and thus to alleviate or eliminate deflection or deformation during the course of grinding. It is not necessary, in order to secure this result, that any of the forces $F_N$, $F_T$, $F_{S1}$ or $F_{S2}$ lie in a purely horizontal or vertical direction.

It may be noted in passing that the constant $K_m$, as explained above, is the predetermined and constant "material removal work function" of a given workpiece material expressed as the energy required to remove a unit volume, e.g., units of foot-pounds per cubic inch removed. The units from $K_m$ may also be thought of in equivalent terms of rates, e.g., power per cubic inch per minute of metal removal. When, at any given instant, workpiece material is being removed at a volumetric rate M' (expressed in units of cubic inches per minute), the product $K_m \times M'$ has units of foot-pounds per minute and thus represents power $PWR_{mr}$ (rate of energy) devoted to removal of workpiece material. That same power $PWR_{mr}$ is expressible as the value of the force component $F_{Tmr}$ devoted to removal of material multiplied by the distance per unit time through which the force component acts. Thus, it may be written:

$$PWR_{mr} = K_m \times M \quad (10)$$

$$PWR_{mr} = F_{Tmr} \times S_r \quad (27)$$

Combining Equations (10) and (27):

$$F_{Tmr} = \frac{K_m \times M'}{S_r} \quad (28)$$

Now, the power Equation (8) can be expressed totally in terms of tangential force components times the distance through which each component acts per unit time. That is:

$$PWR_f = PWR_t - PWR_{mr} \quad (8a)$$

$$F_{Tf} \times S_r = (F_T \times S_r) - (F_{Tmr} \times S_r) \quad (29)$$

Substituting $F_{Tmr}$ from (28) into (29) yields:

$$F_{Tf} = F_T - \frac{K_m \times M'}{S_r} \quad (30)$$

The latter Equation is identical to Equation (15) and thus confirms the relationships here described for finding the value of $F_{Tf}$ and thus $F_N$ at any instant as grinding conditions (feeds, speeds, wheel sharpness, workpiece radius, etc.) unforeseeably change.

The constants $K_m$ and $C_f$ mentioned above are predetermined and known—either from the published literature or from simple grinding tests—for any particular workpiece material. Their values depend upon the properties of the workpiece material and are independent of the particular grit material and grade of any grinding wheel chosen. The latter statement is confirmed by the fact that $K_m$, in units of work performed (e.g., ft.-lbs.) per unit volume (e.g., cubic inches) of material removed, is free of any factor dealing with the implement or mechanism by which the workpiece material is removed. As to the dimensionless ratio $C_f$, which is the coefficient of friction, it is known that such coefficient is in value a reflection of the properties of the softer one of the two materials in two objects engaged in rubbing contact with one another. Thus, one may find the predetermined values for the constants $K_m$ and $C_f$ by grinding the same workpiece of the material in question (or two workpieces of that same material) with two different wheels (say, wheels which differ as to their grit material, grit size and,/or grade) while holding the two respective normal infeed forces at known values and recording the measured values of wheel torque $TOR_w$, wheel radius $R_w$ and the parameters which indicate the material removal rate M'.

Specifically, assume that the two grinding tests are carried out with two different wheels a and b, so that the letters a and b may be employed as subscripts in the relationships for the two tests. Wheel a is caused to grind the workpiece with a constant normal infeed force $F_{Na}$ created, for example, by using a known weight and pulley to move the wheel slide WS (FIG. 1) into the work. Wheel b, in a separate test, is caused to grind the same workpiece with a constant normal infeed force $F_{Nb}$ created similarly, for example, using a known weight with the pulley to move the wheel slide WS into the work. Merely for convenience, it will be assumed that the same weight is employed for the two grinding tests, so that:

$$F_{Na} = F_{Nb} = F_N \quad (31)$$

During each grinding test, the transducers of FIG. 1 are employed to give the values for $TOR_w$, $R_w$, $R_p$, $R'_p$, $\omega_w$ and $\omega_p$.

For the grinding tests with wheels a and b, Equation (8) applies:

$$PWR_{ta} = PWR_{fa} + PWR_{mra} \quad (32)$$

$$PWR_{tb} = PWR_{fb} + PWR_{mrb} \quad (33)$$

Substituting Equations (9) and (10) into the last two equations written above gives:

$$PWR_{ta} = F_{Tfa} \times S_{ra} + K_m \times M'_a \quad (34)$$

$$PWR_{tb} = F_{Tfb} \times S_{rb} + K_m \times M'_b \quad (35)$$

And from Equation (16) the tangential friction force components $F_{Tf}$ may be substituted to arrive at:

$$PWR_{ta} = C_f \times F_{Na} \times S_{ra} + K_m \times M'_a \quad (36)$$

$$PWR_{tb} = C_f \times F_{Nb} \times S_{rb} + K_m \times M'_b \quad (37)$$

But by using Equation (31) and solving Equation (36) for $F_N$ to substitute into Equation (37), one arrives at:

$$K_m = \frac{PWR_{tb} - \frac{S_{rb}}{S_{ra}} \times PWR_{ta}}{M'_b - \frac{S_{rb}}{S_{ra}} \times M'_a} \quad (38)$$

All quantities in Equation (38) are ascertainable from measurements made during the two grinding tests. That is, from what has been said above, it is known that:

$$S_{ra} = 2\pi(R_{wa} \times \omega_{wa} + R_{pa} \times \omega_{pa}) \quad (39)$$

where $R_{wa}$, $\omega_{wa}$, $R_{pa}$ and $\omega_{pa}$ are simultaneously observed values during the grinding test with wheel a. A similar expression permits the value $S_{rb}$ to be determined and computed as a numerical value. It is also known that:

$$PWR_{ta} = F_{Ta} \times S_{ra} = \frac{TOR_{wa}}{R_{wa}} \times S_{ra} \quad (40)$$

where $TOR_{wa}$ is the observed value of wheel torque during the grinding test with wheel a. A similar expression permits the value of $PWR_{tb}$ to be determined and computed as a numerical value. Lastly, it is known that:

$$M'_a = 2\pi \times L_a \times R_{pa} \times R'_{pa} \quad (41)$$

where $L_a$ is a known length and $R_{pa}$ and $R'_{pa}$ are simultaneously determined values during the grinding test with wheel a. A similar expression permits the value of $M'_b$ to be computed as a numerical value. Thus, all quantities in Equation (38) are numerically known, and the numerical value for $K_m$ is established by solving that equation.

Next, Equation (36) is solved for $C_f$:

$$C_f = \frac{PWR_{ta} - K_m \times M'_a}{F_N \times S_{ra}} \quad (42)$$

The numerically determined value for $K_m$ is plugged into this Equation (42), and all other quantities are known as explained above (the value of $F_N$ being directly known from the weight chosen to produce infeeding during grinding tests with wheels a and b). Thus, a numerical value for the friction coefficient is established. Equation (42) shows $C_f$ to be a dimensionless number, which corresponds to the nature of a friction coefficient; and Equation (38) shows $K_m$ to have dimensions of work per unit volume of workpiece material removed. Thus, the validity of these equations is confirmed.

A Working Example of The Invention

In the particular embodiment illustrated in FIGS. 1 and 4–6, each pair of steadyrests located along the length of the workpiece 24 includes a lower steadyrest 100 and an upper streadyrest 101. Both the steadyrests 100, 101 are mounted for pivoting movement on a common shaft 102 and carry respective pads 103 and 104 for sliding engagement with the workpiece 24; the pad 103 on the lower steadyrest 100 engages the bottom of the workpiece at a point 90° away from the grinding interface, while the pad 104 on the upper steadyrest 101 engages the workpiece at a point 165° away from the grinding interface.

For the purpose of urging the two steadyrests 100 and 101 against the workpiece 24, a pair of hydraulic cylinders 105 and 106 are mounted on the Z-axis slide ZS, with the piston rods of these two cylinders bearing against respective rollers 107 and 108 carried by the corresponding steadyrests 100 and 101. Adjustable mechanical stops 109 and 110 ensure that the steadyrests 100, 101 never push the axis of a finished workpiece beyond the desired axis defined by the workpiece centers, regardless of the forces exerted on the steadyrests by the pistons within the hydraulic cylinders 105, 106. The stop 109 can be set at precisely the desired positions—prior to the grinding of any given part or series of parts—by inserting a finished master part in the grinding machine, advancing the steadyrest 100 against the master part but with zero force, setting the stop 109 at that positions, and then retracting the steadyrest and removing the master part. Stop 101 operates in a different manner, as will be described in detail below.

The mechanical stops 109 and 110 not only ensure that the steadyrests are not advanced too far (i.e., so far as to permit the workpiece to be ground to a radius smaller than the desired final radius), but also can be used to fix the positions of successive axially spaced pairs of steadyrests as the grinding of successive sections of a long workpiece is completed.

Each time the grinding of one axial segment of a workpiece is completed, all the steadyrests located adjacent that segment of the workpiece are "locked-up" so that the completed portion of the workpiece is constrained to rotate about precisely the desired axis while the remainder of the workpiece is ground. It should be noted, however, that a given steadyrest held against its stop and engaging a finished surface of final diameter will not (in view of the stop-setting procedure) exert any force at all on the workpiece unless some external influence tends to bow the workpiece away from the desired axis and toward the steadyrest pad.

Figure 4:
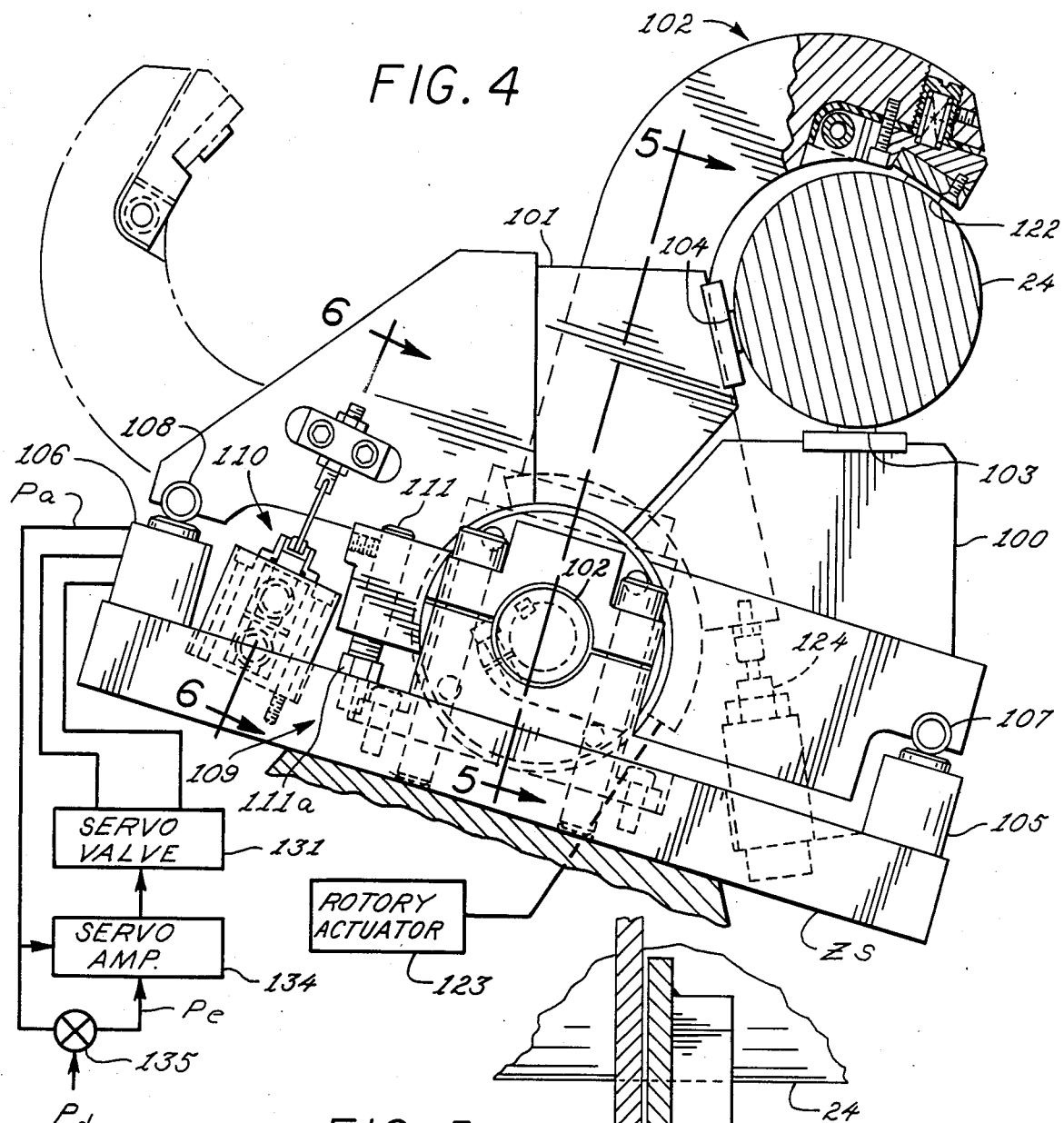
FIG. 4 is an end elevation view of a steady rest mechanism corresponding to that shown diagrammatically in FIG. 1, with certain associated control components shown in block diagram form.

As can be seen most clearly in FIG. 4, the mechanical stop 109 for the lower steadyrest 100 in the illustrative embodiment takes the form of adjustable screws 111 and 111a, respectively, which can be threaded in and out so that they abut each other at a selected limit position. The steadyrest 100 is held in its fully advanced position by applying full pressure to the hydraulic cylinder 105 so that the steadyrest is held rigidly against its mechanical stop 109.

In accordance with one of the features of this invention, the mechanical stop for the upper steadyrest includes a following mechanism which follows the steadyrest as it is being advanced and prevents retracting movement of the steadyrest, and a locking mechanism which can be activated by the control system to lock the steadyrest in a fixed fully advanced position when the workpiece has been ground to the desired final size. The primary advantage of the variable mechanical stop is that the fully advanced "locked" position of the steadyrest can be determined by the in-process gage which monitors the workpiece radius during grinding. It is normally this gage that ultimately determines when the workpiece has been ground to the prescribed final size and, therefore, when sparkout is to occur. If both the steadyrests 100 and 101 have mechanical stops that must be preset, there is always the possibility, even liklihood, that the gage will command that the grinding be stopped at a point where the finished surface of the workpiece does not precisely coincide with the fully advanced "locked" positions of the steadyrests as determined by their mechanical stops. This can result in either a gap between the steadyrest and the workpiece surface (which means that the workpiece is not properly supported) or in a steadyrest force that continues to urge the workpiece into rubbing contact with the grinding wheel after the workpiece has attained the desired final dimension and surface finish. With the controllably variable mechanical stop provided by this invention, however, the upper steadyrest 101 is not locked up until the grinding has been terminated in response to a gage signal indicating that the desired final radius has been reached. Thus, the locked position of the steadyrest is determined by the in-process gage rather than a mechanical setting made before the grinding process even started.

In the illustrative embodiment, the variable stop is connected to the horizontal steadyrest 101 by means of a bracket 112, which in turn is connected by a threaded fastener 113 and a spring steel strip 114 to an adjustable block 115. The block 115 is mounted for sliding movement within a housing 116 which also contains a pair of wedges 117 and 118 mounted for sliding movement transverse to the direction of movement of the block 115. The wedge 117 passes through a hole in the block 115, with an inclined surface 117a on the wedge sliding over a complementary surface 115a formed by the bottom surface of the hole in the block 115. The wedge 118 slides beneath the block 115 with an inclined surface 118a on the wedge riding over a complementary surface 115b formed by the bottom surface of the block 115. Movement of the two wedges 117 and 118 is controlled by a pair of pneumatic cylinders 119 and 120, respectively, mounted on the left hand side of the housing 116 as viewed in FIG. 6.

During grinding, the wedge 118 is in continuous engagement with the bottom surface 115b of the block 115, with the cylinder 120 applying a constant biasing pressure against the wedge 118. Thus, the wedge 118 is continuously advanced as the block 115 is raised by advancing movement of the steadyrest 101, thereby preventing retracting movement of the steadyrest. When grinding of the particular surface engaged by this steadyrest is completed, as indicated by a signal from the in-process part gage indicating that the workpiece has been ground to the desired final size, the cylinder 119 is actuated to advance the wedge 117 to the solid-line position illustrated in FIG. 6, i.e., with the complementary surfaces 117a and 115a in full engagement with each other. This locks the block 115, and thus the steadyrest 101, in that position. It will be noted that the wedge surface 117a has a steeper angle than the surface 117a on the follower wedge, e.g., 14° for the surface 117a and 10° for the surface 188a, so that the wedge 117 cannot be retracted by the air cylinder pressure on the wedge 118.

In order to hold the final ground surface engaged by the steadyrests 100 and 101 in a stable position on the true axis of rotation of the workpiece 24, after this particular surface has been ground to final size, the third steadyrest 102 is brought into engagement with the workpiece 24. This third steadyrest 102 has a pad 122 which bears against a top surface of the workpiece, so that the combination of the steadyrest pads 103, 104 and 122 provide a stable three-point support for the top ground surface of the workpiece. Because the top steadyrest 121 is brought into engagement with the workpiece 24 only after the grinding of this particular surface of the workpiece has been completed, this steadyrest is not force-controlled. Thus, a simple rotary actuator 123 controls the movement of the top steadyrest 102 between a retracted position, illustrated in broken lines in FIG. 4, and an advanced position, illustrated in solid lines in FIG. 4. As the steadyrest pad 122 approaches the surface of the workpiece 24, the steadyrest 122 engages a conventional shock absorber 124.

Figure 7:
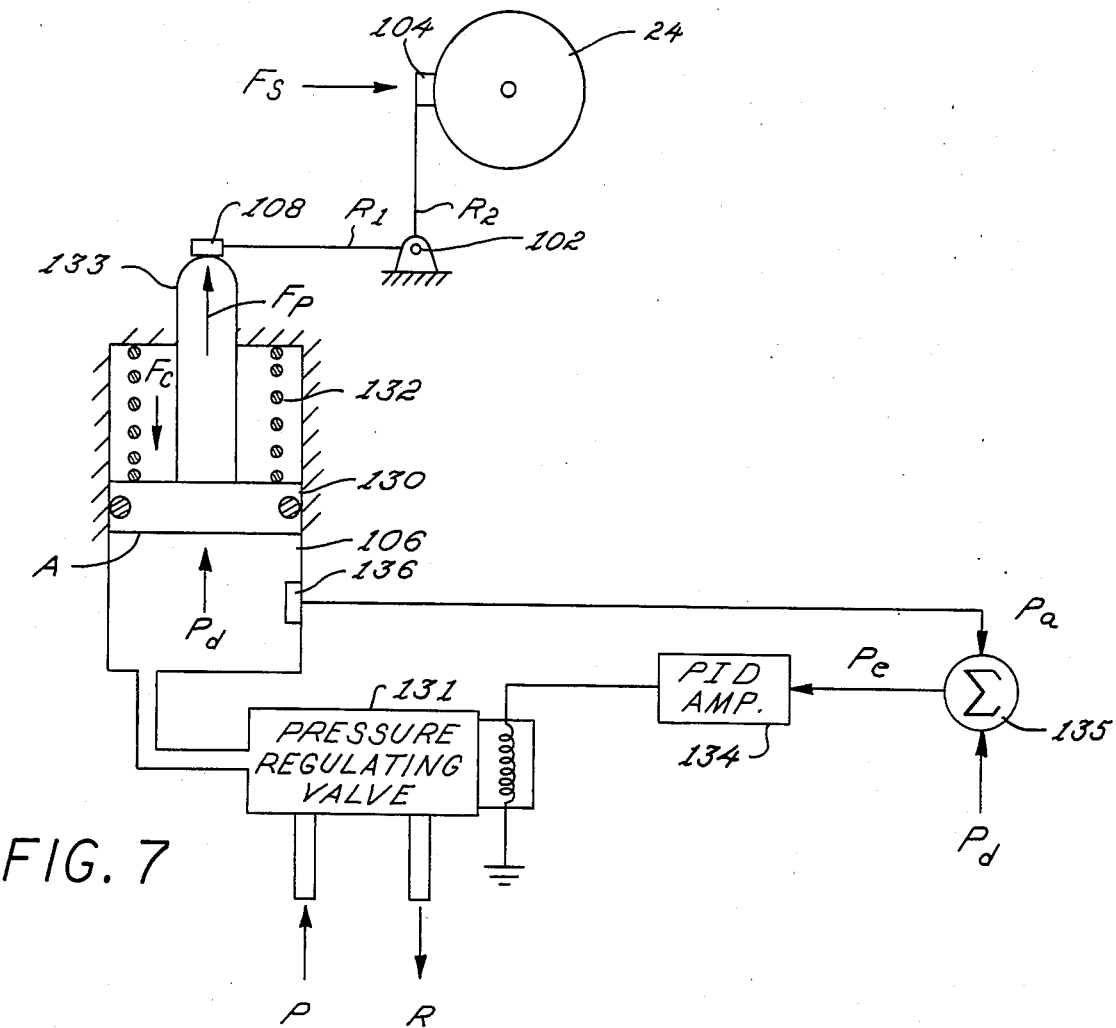
FIG. 7 is a diagrammatic illustration of the control system associated with one of the steadyrests in FIGS. 1-6.

The pistons 130 (see FIG. 7) in the two hydraulic cylinders 105 and 106 are controlled by separate servo valves 131, only one of which is shown in FIGS. 4 and 7. This servo valve 131 functions as a pressure regulator which controls the hydraulic pressure applied to a piston 130 in the hydraulic cylinder 106. The piston 130 is lightly biased against the hydraulic pressure in the cylinder 106 by an internal return spring 132. As the hydraulic pressure is modulated by the servo valve 131, the piston 130 is advanced or retracted by the opposing forces exerted thereon by the hydraulic pressure, the mechanical spring, and the external load on the piston rod 133.

The servo valve 131 is controlled by the electrical output signal from a servo amplifier 134 which receives an error signal $P_e$ from a summing junction 135 receiving a command signal $P_d$ and a feedback signal $P_a$. The amplifier 134 preferably has PID (proportional, integral and derivative) response characteristics. The command signal $P_d$ represents the desired pressure for the hydraulic cylinder 106, and the feedback signal $P_a$ represents the actual pressure in the cylinder 106 as sensed by an internal pressure transducer 136. The junction 135 algebraically sums its two input signals $P_d$ and $P_a$ and produces a corresponding output signal $P_e$ which causes the servo valve 131 to maintain the commanded pressure in the cylinder 106. Thus, the "actual pressure" and "commanded pressure" signals $P_a$ and $P_d$ are algebraically summed by the junction 135 to produce a "pressure error" signal $P_e$ proportional to the difference, if any, between the actual output pressure in the cylinder and the commanded pressure. This error signal maintains the servo valve 131 in the position required to maintain the commanded pressure in the cylinder 106.

Because of the positive feedback in the servo loops controlling the pistons 130, a runaway condition can be reached as the gain steadily increases, causing the corresponding error signal also to increase. To avoid such a runaway condition, the gain factor of the loop itself could be lowered to prevent the runaway point from being reached, but this would put a severe constraint on the electrical signal available for controlling the servo amplifier.

As a part of this invention, a filter is used in the feedback loop to cause a lag in the positive feedback by a predetermined factor of time, which in the illustrative system is typically 4 seconds. Such a delay incorporated within the feedback loop not only avoids runaway conditions, but also tends to hold certain types of workpieces closer to their true centerline during finish grinding, when the grinding forces are decreasing. Certain workpieces such as crankshafts have a natural tendency to orbit about their true centerline. With the steadyrest force reductions lagging slightly behind the grinding forces, the counterbalancing forces applied to the workpiece by the steadyrests are somewhat greater than the grinding forces, particularly during the early stages of finish grinding. This extra force applied by the steadyrests tends to inhibit the natural tendency of the crankshaft to follow an orbital path, thereby facilitating finish grinding. Toward the end of finish grinding, the grinding forces level off, and thus the lag in the counterbalancing forces applied by the steadyrests becomes inconsequential.

An undesirable side effect of the delay introduced in the positive-feedback loop of the force-controlling servo system is that the workpiece can be deflected away from its true axis of rotation when initially engaged by the grinding wheel. The wheel slide is normally position-controlled to achieve a selected grind rate, and thus the wheel slide will continue to be fed into the workpiece until the workpiece gage indicates that the radius of the workpiece is reducing at the desired grind rate. Because of the lag in the steadyrest control loop, however, the initial force of the wheel against the workpiece is not counterbalanced; consequently, the wheel will bend the workpiece away from its true axis of rotation as grinding is started and built up to the desired rate.

To avoid the undesirable workpiece deflection described above, the steadyrest control system anticipates the initial grinding forces and applies corresponding counterbalancing pressures to the steadyrests before the workpiece is engaged by the grinding wheel. This premature application of counterbalancing forces by the steadyrests has the effect of pre-bending the workpiece away from its true axis of rotation, toward the grinding wheel. Then the initial feeding movement of the wheel, after it engages the workpiece, merely removes the pre-bend and restores the workpiece to its true axis of rotation. Of course, grinding also begins during this initial feeding movement, reaching the desired rate at the point where the workpiece has been restored to its true axis of rotation because that is where the grinding forces are exactly counterbalanced by the steadyrest forces.

Returning now to FIG. 7, the force $F_p$ exerted by the piston rod 133 on the roller 108 is the commanded hydraulic pressure $P_d$ multiplied by the area A of the piston face, minus the counter force $F_c$ exerted on the piston by the spring 132 and sliding friction. Thus:

$$F_p = (P_d \times A) - F_c \tag{43}$$

where $F_c$ is the return force of the spring 132, assumed to be constant because the spring is chosen to have a low scale constant and is always somewhat compressed, plus the sliding friction of the piston and its packing. This force $F_p$ is the force applied to the roller 108 of the steadyrest via the piston rod 133.

The force $F_S$ actually applied to the workpiece 24 by the steadyrest pad 104 is the piston rod force $F_p$ multiplied by the ratio of the respective radial distances of the roller 108 and pad 104 from the pivot axis of the shaft 102. In FIG. 7, these radial distances are illustrated schematically and identified as R1 and R2, respectively. Thus:

$$F_S = F_p \times \frac{R1}{R2} \tag{44}$$

$$= (P_d \times A - F_c) \times \frac{R1}{R2} \tag{45}$$

It will be apparent from Equation (45) that it is the commanded pressure $P_d$ that must be controlled to produce a final steadyrest output force $F_S$ equal to the desired value.

The desired value of this commanded pressure can be determined by solving Equation (45) for $P_d$:

$$P_d = \frac{F_S \times \frac{R2}{R1} + F_c}{A} \tag{46}$$

The variable force exerted by the upper steadyrest 101 on the workpiece 24, under the control of a hydraulic piston 130, a servo valve 131 and an amplifier 134, is continuously controlled by dynamically changing the command signal $P_d$ to counterbalance the normal force $F_N$ applied to the workpiece 24 from the grinding wheel 20. In the case of the hydraulic piston for the lower steadyrest 100, the variable force exerted on the workpiece is similarly controlled to counterbalance the tangential force component $F_T$ applied to the workpiece 24 from the grinding wheel 20.

Thus, for the upper steadyrest 101, the desired steadyrest force $F_S$ in Equation (46) is $F_N$, so the desired pressure $P_{dh}$ to be applied to the piston of the upper steadyrest is:

$$P_{dh} = \frac{F_N \times \frac{R2}{R1} + F_c}{A} \tag{47}$$

For the lower steadyrest 100, the desired steadyrest force $F_S$ in Equation (46) is $F_T$ plus a constant force component $F_{wf}$ to counterbalance the force WF due to the weight of the workpiece (see Equation 6(a) above). Consequently, the desired pressure $P_{dv}$ to be applied to the piston of the lower steadyrest is:

$$P_{dv} = \frac{(F_T + F_{wf}) \times \frac{R2}{R1} + F_c}{A} \tag{48}$$

Figure 8:
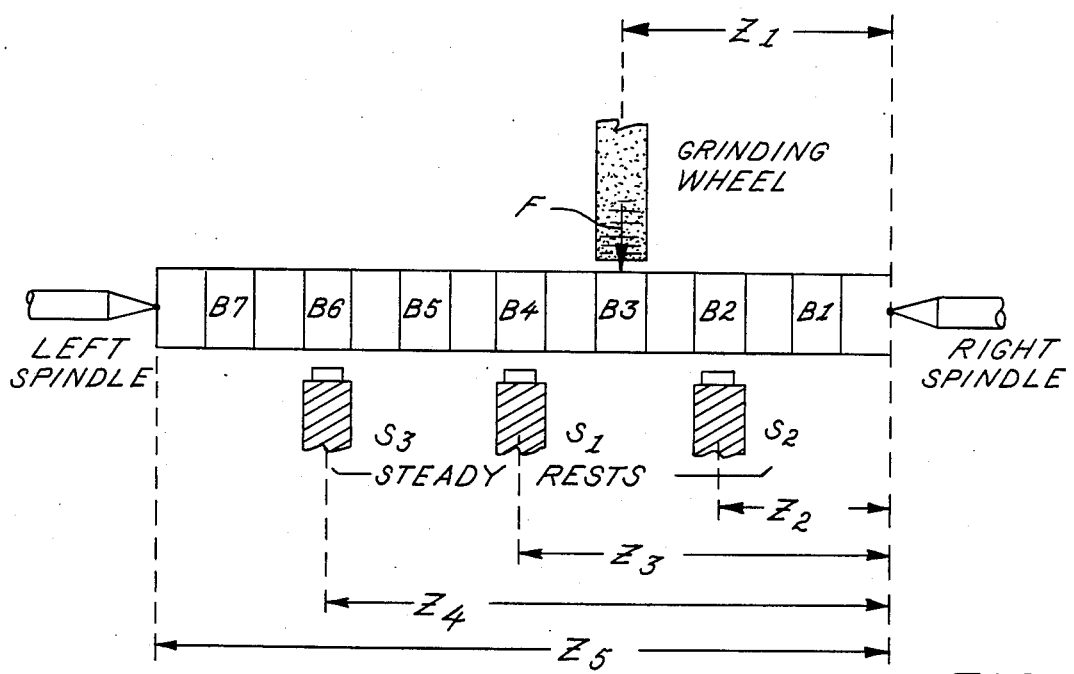
FIG. 8 is a diagrammatic illustration of a long cylindrical workpiece engaged by a grinding wheel on one side, three longitudinally spaced steadyrests on the other side, and a pair of spindles at opposite ends.

FIG. 8 diagrammatically illustrates one exemplary grinding application in which a grinding force F is applied to a workpiece 24 at a distance $Z_1$ from the right hand spindle, and three pairs of steadyrests S1, S2 and S3 are located at respective distances $Z_2$, $Z_3$ and $Z_4$ from the right hand spindle. The workpiece in this case consists of seven bearing surfaces, B1–B7, which are to be ground to required dimensions. Only one pair of steadyrests is activated at any given time to counterbalance the instantaneous grinding force. The three pairs of steadyrests are evenly distributed axially along the workpiece as shown with S1 located directly adjacent the bearing surface B4, S2 directly adjacent the bearing surface B2, and S3 directly adjacent the bearing surface B6. The grinding process is carried out by grinding the bearing surface B4 first, then surface B2, and finally surface B6.

Before the grinding contact occurs between the workpiece and the grinding wheel, the steadyrest pair S1 is brought into contact with the bearing surface B4 on the workpiece. During the grinding of the bearing surface B4, the two steadyrest pairs S2 and S3 are inactive, and the grinding force on the workpiece is counterbalanced by the forces applied by the steadyrest pair S1. The magnitudes of these counterbalancing forces are determined by controlling the pressure supplied to the steadyrest cylinders 105 and 106 in accordance with Equations (47) and (48).

To determine the value of the force $F_{wf}$ needed to counterbalance the force WF due to the weight of the workpiece, the workpiece can be viewed as a beam supported at three or more points along its axis. Such a problem is statically indeterminate with three unknown reactions. Two independent equations can be written by performing the summation of the vertical forces and the moments involved. A solution to the problem may be obtained from an additional equation obtained by accounting for the deformation of the workpiece. This can be done in a variety of ways and is well known in the art of engineering statics (e.g., *Design of Machine Elements*, Spott, 1971, pages 135–136). It suffices to state here that the reaction $F_r$ produced at the median support is given in its final form by:

$$F_r = \frac{FZ_1}{2(Z_5 - Z_3)Z_3^2}[Z_3^2 + 2(Z_5 - Z_3)Z_3 - Z_1^2] \quad (49)$$

where F represents the force exerted on the workpiece by the grinding wheel at the grinding interface, and $Z_1$ $Z_3$ and $Z_5$ are the distances illustrated in FIG. 8.

Following the grinding of the bearing surface B4, the steadyrest pair S1 is locked up, and the third steadyrest 102 associated with that pair is advanced into engagement with the workpiece. This provides a stable three-point support for the bearing surface B4 while the other bearing surfaces are being ground.

Still referring to FIG. 8, the grinding wheel is next indexed to the bearing surface B2, which is the surface engaged by the steadyrest pair S2. Thus, during the grinding of surface B2, only the steadyrest pair S2 is active to counterbalance the grinding forces. As in the case of the steadyrest pair S1, the magnitudes of the counterbalancing forces are determined by controlling the pressures supplied to the steadyrest cylinders 105 and 106 in accordance with Equations (47) and (48). After the grinding of surface B2, the steadyrest pair S2 is locked up, and the third steadyrest 102 associated with that pair is also brought into engagement with the workpiece.

The next surface to be ground is the bearing surface B6 located adjacent the steadyrest pair S3. Once again, the pressures required to produce the desired counterbalancing forces are computed using Equations (47) and (48), and after the grinding of surface B6 is completed all three of the steadyrests in the set S3 are locked in fixed positions against the ground surface.

At this stage in the grinding process, all three steadyrest sets S1, S2 and S3 are locked up. The number of steadyrest sets used and their spacing is an important factor and is a predetermined value for the system, based on the length of the workpiece, type of grinding interface, accuracy of finish required, etc. In the illustrative embodiment of FIG. 8, the steadyrest pairs S1, S2, and S3 are assumed to have been placed optimally such that, once they are locked up, the remaining surfaces to be ground on the workpiece can be ground without significant deflection from the true axis of rotation. Thus, after the steadyrest pair S3 is locked up, bearing surfaces B1, B3, B5 and B7 are ground sequentially without any deflection problems. After all the bearing surfaces B1-B7 have been ground, the grinding wheel is retracted and the forces exerted by the steadyrests are initialized for the beginning of a fresh grinding cycle on another workpiece.

The preferred means for controlling the grinding apparatus of FIGS. 1–6, using the control method described above, is a programmed digital computer illustrated in FIG. 9, although it could, if desired, be implemented in an analog computer using d-c voltages to indicate signal values, or as a hardwired iterative computer programmed by its wiring connections. The operating details of digital computers are well known to those skilled in the art, and any of a wide variety of such computers currently available in the United States market may be chosen.

By way of background, and as is well known, the computer includes a clock oscillator 140 (FIG. 9) which supplies pulses at a relatively high and constant frequency to a timing signal divider 141 which in turn sends timing signals to the other computer components so that elementary steps of fetching signals from memory, performing arithmetic operations, and storing the results are carried out in rapid sequence according to a stored master program of instructions. For this purpose, the computer includes an arithmetic-logic unit (ALU) 142 served by an input trunk 143. An accumulator 145 receives the output from the ALU and transmits it over an output trunk 146. The output from the accumulator is sent back as an operand input to the ALU in certain arithmetic or comparing steps. These trunks are multiconductor wires which carry multibit signals representing in binary or BCD format numerical values of variables which change as a result of inputs from a tape reader 147 or computations performed by the ALU 142. The tape reader 147 is coupled to the computer via a decoder 148 and an input/output interface 149.

The computer includes signal storage registers within a system storage or "memory" 150 which functionally is divided into sections containing instruction units 150a and data units 150b, as explained more fully below. The memory registers in the instruction section 150a are set by reading in and storage of a "master program" to contain multibit words of instruction which designate the operations to be performed in sequence, with logic branching and interrupts. The instruction memory contains the master program and sets up the gates and controls of the general purpose computer to convert it into a special purpose digital control apparatus, the pertinent portion of that program being described hereinafter. Although a single computer has been illustrated in FIG. 9 for carrying out all the functions needed to control the grinding machine of FIG. 1, it will be understood that these functions can be split among separate computers arranged to share tasks by cross-talking through a common bus.

Since the organization and operation of the digital computer is well known, it will suffice to observe briefly that advancement of a program counter 151 to an address number will cause address selection and routing gates 152 to read the addressed memory instruction onto the input trunk 143 and into an instruction register 154. The operation code in the latter is decoded and sent to the ALU 142 to designate the operation to be performed next (e.g., add, subtract, complement, compare, etc.). It is herein assumed for ease of discussion that the ALU will algebraically add two operands unless instructed to subtract, multiply, divide, and so on. The data address in the instruction register is transferred to and conditions the storage address and routing gates 155 to fetch from memory the data word to be used next as an operand, the multi-bit signals being sent via the trunk 143 to the input of the ALU. At the conclusion of an arithmetic or logic sequence, the result or answer appears in the accumulator 145 and is routed via the trunk 146 through the gates 155 to an appropriate location or register in the memory 150. The gates 155 are controlled by the data address output of the instruction register, so that an answer is sent to the proper memory location for storage, replacing any numeric signals previously stored there.

FIG. 10 is an expanded diagrammatic illustration of the computer memory 150, with the pertinent storage registers or locations having acronym labels to make clear how certain signals are created and utilized. The program instruction section 150a contains a very large number of instruction words which are formulated to cause orderly sequencing through the master program, with branching and interrupts. To avoid a mass of detail and yet fully explain the invention to those skilled in the art, the pertinent program instructions are not labeled in FIG. 13 but are set out in flow charts to be described below.

Figure 5:
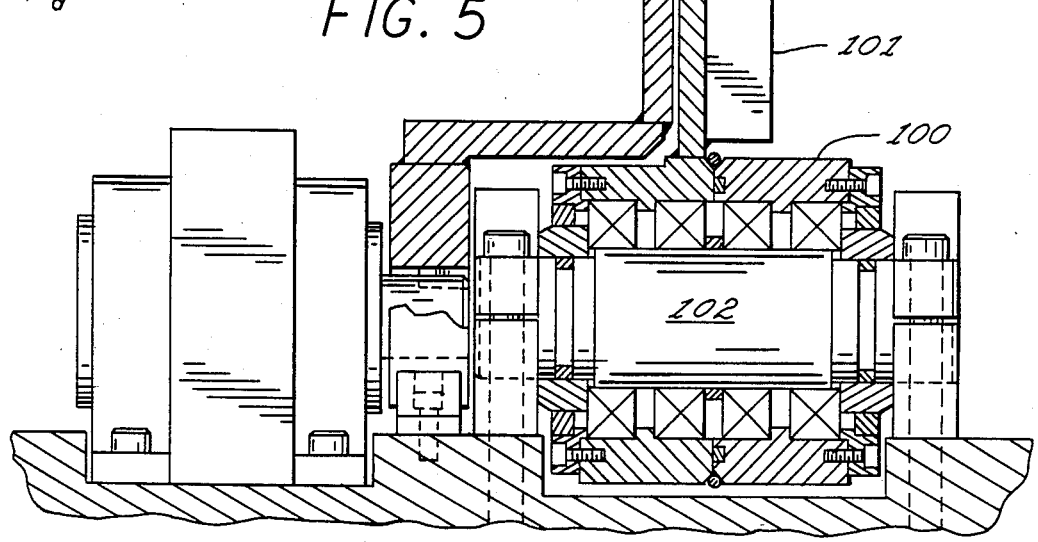
FIG. 5 is a section taken generally along line 5—5 in FIG. 4, on an enlarged scale.
Figure 6:
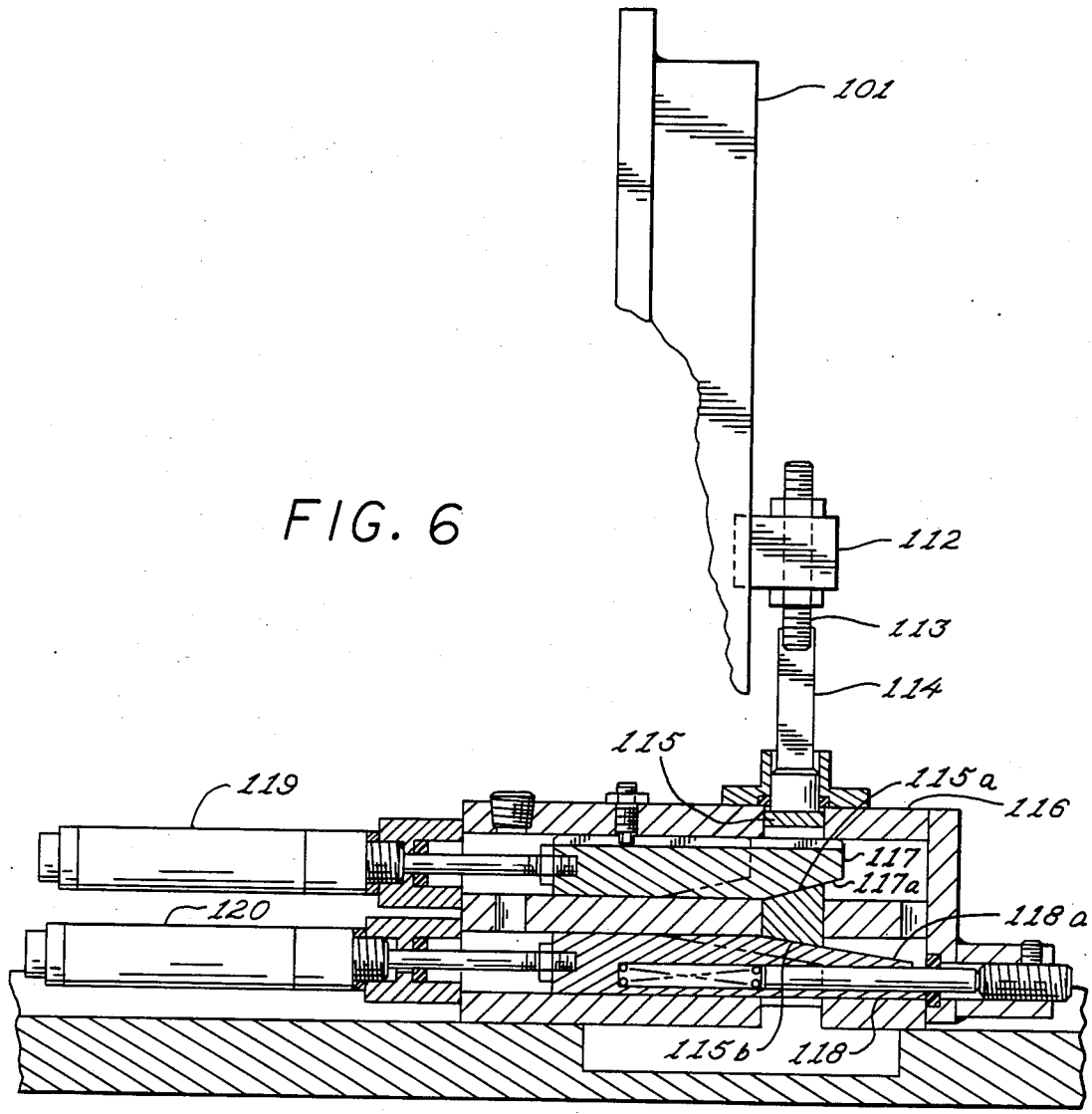
FIG. 6 is a section taken generally along line 6—6 in FIG. 4, on an enlarged scale.

As indicated in FIG. 10, the primary command signals in this particular example are labeled "XVC", "VPM", "VWM", "PDV" and "PDH". (As will be apparent from the ensuing description and the accompanying flow charts, there is a separate pair of signals PDV and PDH for each separate pair of steadyrests; FIGS. 1A and 5 assume only a single pair of steadyrests, but subsequent flow charts assume multiple pairs of steadyrests, as will be explained.) These five digital signals are passed through digital-to-analog converters 161 through 165, respectively, to produce the five voltages $V_{wfm}$, $V_{pm}$, $V_{wm}$, $P_{dv}$ and $P_{dh}$ which drive the respective motors WFM, PM and WM, and the amplifiers 122 for the servo valves 115 controlling the pressure on the two steadyrest pistons 130. Thus, the command signals XVC, VPM, VWM, PDV and PDH control the wheel slide feed rate $F_{ws}$, the rotational velocity $\omega_p$ of the workpiece 24, the rotation velocity $\omega_w$ of the grinding wheel 20, and the requisite pressures $P_{dv}$ and $P_{dh}$ to produce the desired steadyrest forces $F_{Sv}$ and $F_{Sh}$.

FIG. 10 also shows that the transducer signals XR, $\omega_p$, $\omega_w$, $R_p$ and $TOR_w$ from FIG. 1 are brought into the storage section 150b from the position-sensing unit 29, the tachometers 39 and 36, the gage 40, and the transducer 35, respectively. These analog signals are passed through respective analog-to-digital converters 166 through 170 to produce corresponding digital signals labeled "XR", "PTV", "WHV", "GS" and "TORW" respectively. These signals are treated as if they came from memory storage units, and thus by appropriate instruction they can be addressed and sent to the ALU 142.

The diagonal lines at the corners of certain rectangles in FIG. 10 are intended to indicate that the word stored and signaled in that register is a predetermined numerical constant. Of course, the stored number or constant is readily adjustable by reading into the register a different value via a manual data input keyboard or as a part of the master program. As in the case of the transducer signals, these predetermined constant but adjustable signals can also be retrieved and sent to the ALU 142 by appropriate instructions.

The storage section 150b in the memory diagram in FIG. 10 contains means for producing various signals which are utilized and changed periodically, to the end objective of energizing correctly the three motors WFM, PM, and WM and the two servo valves 131. Such means include memory or storage units identified by acronyms which signify not only the storage units but also the signals produced thereby. The quantity represented by the changeable number in any register may be represented by the same acronym, and these numbers can be changed in value by programmed computations or transfers effected by the ALU under control of the stored master program. The acronyms are too numerous to permit all of them to be identified in FIG. 10, but a complete listing is as follows:

A = area of steadyrest piston

BIAS = a preselected constant, but adjustable, signal representing a pressure to be applied to the steadyrest pistons when it is desired to have the steadyrests just lightly engage the workpiece COF = $C_f$ = coefficient of friction for the frictional rubbing of the wheel and workpiece at the grinding interface CORA = sum of PFACTOR, IFACTOR and DFACTOR, used to artificially adjust XAP to compensate for grinding wheel wear DD1 = a preselected constant, but adjustable value, representing a DTG value at which it is desired to initiate simultaneous truing DFACTOR = derivative gain factor in PID servo loop controlling wheel slide motor WFM DTG = the difference between the current workpiece radius value PTRAD and the desired final radius value PTRADD FC = $F_c$ = counter force (assumed constant) exerted on steadyrest piston by return spring FD = a computed value used as the desired X-axis feed rate during the initial portion of finish grinding FGAP = a preselected constant, but adjustable, signal representing the desired value of XFRA during a "gap closing" mode when the wheel is being advanced into engagement with the workpiece FGRFIN = a preselected constant, but adjustable, signal representing the desired value of XFRA during a finish grinding mode FJOG = a preselected constant, but adjustable, signal representing the desired value of XFRA during a "jogging" mode FN = $F_N$ = the portion of the force F that is normal to a line tangent to the wheel surface at the grinding interface FRT=a preselected constant, but adjustable, signal representing the desired value of XFRA during return movement of the wheel to its "parked" position FT=$F_T$=the portion of the force F that is tangential to the wheel surface at the grinding interface GD=a preselected constant, but adjustable, signal representing derivative gain factor to be applied to RADERR in deriving DFACTOR GI=a preselected constant, but adjustable, signal representing integral gain factor to be applied to RADERR in deriving IFACTOR GP=a preselected constant, but adjustable, signal representing proportional gain factor to be applied to RADERR in deriving PFACTOR GPV=a preselected constant, but adjustable, signal representing gain factor to be applied to PTVERR in deriving VPM GR=a preselected constant, but adjustable, signal representing a desired rough grinding rate GS=the signal from gage 40, proportional to the current workpiece radius PTRAD GW=a preselected constant, but adjustable, signal representing gain factor to be applied to WHVERR in deriving VWM GX=a preselected constant, but adjustable, signal representing proportional gain factor to be applied to XERR in deriving XVC IFACTOR=the integral gain factor in PID servo loop controlling wheel slide motor WFM KM=$K_m$=the material removal work function constant KNORAD=the known radius of master part L=a preselected constant, but adjustable, signal representing the axial length of the workpiece LOCK=a preselected constant signal representing a pressure to be applied to the lower steadyrest pistons when it is desired to hold the lower steadyrests in firm engagement with their mechanical stops MACHREF=a preselected constant, but adjustable, signal representing the distance between the rotational axis of the workpiece and the face of the grinding wheel when the wheel is engaging the reference limit switch XRLS and when the wheel has a selected radius (e.g., 12 inches)

PDV=$P_{dv}$=desired pressure to be applied to lower steadyrest piston

PDH=$P_{dh}$=desired pressure to be applied to upper steadyrest piston

PFACTOR=a proportional gain factor in the PID servo loop controlling wheel slide motor WFM PTRAD=$R_p$=workpiece radius PTRADD=$R_{pd}$=desired final workpiece radius (after grinding)

PTRADI=a preselected constant, but adjustable, signal representing a workpiece radius gage signal value for a master workpiece of known radius, PTV=$\omega P$=actual rotational velocity of the workpiece PTVD=$\omega pd$=desired rotational velocity of the workpiece PTVERR=the error or difference between PTV and PTVD RADERR=difference between actual workpiece radius PTRAD and XAP RADW=$R_w$=grinding wheel radius RADWI=starting value of actual workpiece radius REFCH=the difference between XCPI and XCP RETRP=a preselected constant, but adjustable, signal representing a "parked" position to which the grinding wheel is returned before the grinding of new workpiece, or a different axial position on a given workpiece, is started $\Delta T$=time interval for the iterative control system TOPSR=binary signal indicating whether actuator for top steadyrest is to be energized TORW=$TOR_w$=torque exerted to drive the grinding wheel VPM=$V_{pm}$=drive signal for workpiece motor PM VWM=$V_w$=drive signal for grinding wheel motor WM VWMI=a preselected constant, but adjustable, signal representing a suitable idling speed for the grinding wheel drive motor WM when no grinding is taking place WDGCY=binary signal indicating whether drive cylinder for locking wedge in upper steadyrest stop mechanism is to be energized WF=the force of weight of a workpiece that tends to sag or bow downwardly in its axially intermediate regions WHV=$\omega_w$=actual rotational velocity of grinding wheel WHVD=$\omega_{wd}$=desired rotational velocity of grinding wheel WHVERR=the error or difference between WHV and WHVD $\Delta X$=commanded X-axis slide feed rate in inches per $\Delta T$ XAP=actual position of X-axis slide relative to rotational axis of the workpiece, sometimes artificially adjusted by a quantity COR$\Delta$ to make distance from rotational axis of workpiece seem smaller than it actually is $\Delta XAP$=change in XAP during any given period $\Delta T$ XCEP=a commanded end position to which X-axis slide WS is to be moved XCP=commanded position of X-axis slide WS relative to rotational axis of workpiece XERR=the error difference between XCP and XAP XFRA=commanded X-axis slide feed rate in inches per minute XR=position sensor signal indicating actual position of X-axis slide WS XSO=a preselected constant, but adjustable, signal representing distance between rotational axes of grinding wheel and workpiece when workpiece is in reference position (engaging XRLS)

XVC=$V_{wfm}$=drive signal for X-axis slide feed motor WFM

ZRAT=a preselected constant, but adjustable, signal representing the value by which a desired steadyrest force is to be multiplied to compensate for the different Z-axis positions of the steadyrests and the grinding wheel The foregoing acronyms will be used hereinafter with various subscripts, suffixes and prefixes which have readily apparent meanings. For example, the subscript i signifies the instantaneous value in the current iteration interval $\Delta T$, the subscript (i-1) signifies the value in the preceding interval $\Delta T$, etc. The suffix "AVG" or "AV" added to any of the acronyms indicates an average value of that quantity, usually an average of ten values for the last ten iteration intervals $\Delta T$, and the suffix "I" indicates an initial value of that particular quantity. The prefix "$\Sigma$" added to any of the acronyms indicates a sum of several such values, usually the sum of the ten values measured or computed during the last ten iteration intervals ΔT.

In carrying out this particular embodiment of the invention, the computer system of FIG. 9 is conditioned by a master program to constitute a plurality of means for performing certain functions and to carry out the method steps which are involved. The computer system is not the only apparatus involved, however, since the position sensor 29, the tachometers 36 and 39, the gage 40, the ADC converters 166–170, the DAC converters 161–165, the motors WFM, PM and WM, and the servo valves 115 and amplifiers 122 are all outside the computer system. With this in mind, a detailed understanding of this embodiment of the invention may best be gained from a narrative sequence of the operations which repeatedly recur, the pertinent subroutines of the master program thereby being explained in detail with reference to the flow charts in FIGS. 12 through 17.

FIG. 11 illustrates a main program which the computer system follows while being interrupted at successive intervals for execution of the subroutines illustrated in FIGS. 12 through 17. For example, the successive time periods ΔT measured off by the clock 140 and the timing signal generated by the divider 141 may be 40 milliseconds in duration. Within each such period, sub-periods are marked off by timing interrupts so that each subroutine may be entered during every ΔT. There will almost always be time remaining at the end of each such sub-period during which the system returns to the main program and resumes execution thereof. Thus, each subroutine is entered once during each of the main iteration periods ΔT, e.g., every 40 ms. Computational step pulses typically appear every 20 microseconds, so that 2000 fetch, compute or store steps may be executed during each 40-ms. interval. The various servo motors are preferably updated multiple times within each iteration interval ΔT, e.g., in accordance with the "micromove-macromove" system described in U.S. Pat. No. 3,656,124. The particular time periods mentioned here are exemplary only, and these periods can be chosen to have other specific values.

Referring now to FIG. 11, there is shown a main program which the system follows whenever power to the grinding machine is turned on. The first step 001 clears all flags in the system, after which step 002 produces a prompting message instructing the operator to enter the desired predetermined values for the various set points and constants required in later steps. This prompting message is typically displayed on the CRT 156 (FIG. 9) located adjacent the manual data input keyboard 157. The particular values that must be entered by the operator are those values contained in the rectangles with the diagonal corner lines in the memory diagram of FIG. 10. These values may be manually keyed into the memory 150, or they may be previously recorded on a tape and entered via the tape reader 147.

At step 003, the system produces another prompting message which instructs the operator to load a workpiece of known radius and to key-in the value KNORAD of that known radius. This workpiece of known radius is normally a "master" part which has been previously ground to a smooth surface finish, and whose radius has been precisely measured with a micrometer. As will be seen from the ensuing description, the use of such a "master" part is desirable because it permits the starting position of the grinding wheelface to be known with a high degree of precision, and it also permits the starting radius of the grinding wheel to be accurately computed in those applications where it is necessary or desirable to know the wheel radius. Alternatively, for applications where such a high degree of precision is not required, the workpiece that is initially loaded into the machine may be the actual workpiece to be ground; although such a workpiece will have a rougher surface than a "master" part, and its starting radius will not be ascertainable with the same degree of precision as a "master" part, the degree of accuracy attainable by starting with such a rough part may be acceptable in a large number of applications.

At step 004, the system displays still another prompting message which instructs the operator to start the drive motors PM and WM which rotate the master workpiece and the grinding wheel, respectively. Of course, as soon as these motors PM and WM are started, the subroutines to be described below for controlling the rotational velocities of these motors will immediately take over control of the motors, supplying them with the voltage levels required to achieve and maintain the desired speeds.

At step 005, the system displays yet another prompting message which instructs the operator to "Perform Machine Reference", which the operator initiates by simply closing an "MREF" switch, which is one of the switches 157 indicated generally in FIG. 9 and typically located on the keyboard. This prompting message might be displayed before the operator has completed all the set-up steps indicated by the previous messages at steps 002, 003 and 004, and thus the system sustains the message to "Perform Machine Reference" until step 006 senses the closing of the "MREF" switch. When this switch is closed, the system proceeds to step 007 and sets a "Mode 1" flag MD1 which enables the X-axis subroutine of FIG. 7 to advance the wheel slide at a "jogging" feed rate FJOG whenever the operator closes a "JOG" switch, which is another one of the switches 157 in FIG. 9.

In mode 1, the wheel slide feed motor WFM is energized to move the wheel slide at the rate FJOG whenever the operator closes the "JOG" switch, with the direction of movement depending upon whether the operator moves the "JOG" switch to the "forward" position (producing a minus FJOG signal which causes the wheel slide to move toward the workpiece) or to the "reverse" position (producing a plus FJOG signal which causes the wheel slide to move away from the workpiece). Energization of the motor WFM to move the wheel slide at this rate, when the "jog" switch is closed, is effected by the X-axis subroutine of FIG. 12. That is, the axis of movement of the wheel slide is referred to herein as the "X-axis".

The X-axis subroutine of FIG. 12 begins at step 101 which samples a disabling flag DISABL. If this flag is off, the subroutine proceeds to step 102 which determines whether or not the mode 1 flag MD1 is on. If it is, the system proceeds to step 103 which determines whether or not the operator has closed the "JOG" switch. If the answer is affirmative, the system sets a commanded feed rate XFRA (in inches/minute) equal to the jogging rate FJOG at step 104, and this commanded feed rate XFRA is then used at step 106 to determine the value of $\Delta X_i$, which is the commanded feed rate in inches/ΔT. That is, step 106 merely converts the commanded inches-per-minute signal XFRA to an inches-per-ΔT signal by dividing XFRA by 1500, because there are 1500 40-ms ΔT's in each minute. In other words, $\Delta X_i$ represents the incremental distance through which the wheel slide must be advanced in one iteration interval ΔT of 40 ms in order to achieve the desired feed rate FJOG, which is keyed into the memory in units of inches per minute.

It will be helpful to note at this point that the different wheel slide feed rates required during the different modes of operation are achieved by simply changing the value of the commanded feed rate signal XFRA in the X-axis subroutine of FIG. 12. Changing the value of XFRA always results in a corresponding change in the value of $\Delta X_i$, which in turn changes the level of the energizing voltage $V_{wfm}$ supplied to the wheel slide feed motor WFM.

Before the value of $\Delta X_i$ is determined at step 106, the subroutine of FIG. 12 proceeds to step 105, where the resolver signal XR is read. This resolver signal represents the changing position of the output shaft of the motor WFM, and thus the change $\Delta XAP_i$ between each pair of successive readings $XR_i$ and $XR_{i-1}$ of the resolver signal represents the actual change in position of the wheel slide in the iteration interval between the readings $XR_i$ and $XR_{i-1}$. Thus, the signal $XAP_i$ representing the current actual position of the wheel slide can be continually updated by adding each new $\Delta XAP_i$ to the value of the previous position signal $XAP_{i-1}$, which is the second computation carried out at step 105 as illustrated in FIG. 12.

At step 107, the signal $XCP_i$ representing the current commanded position of the wheel slide is similarly updated in each iteration interval by adding the value $\Delta X_i$ to the previous commanded position signal $XCP_{i-1}$, which is the first computation carried out at step 107 as illustrated in FIG. 12. The second computation at step 107 determines the value of an error signal $XERR_i$, which is the difference between the current commanded position signal $XCP_i$ and the current actual position signal $XAP_i$. This error signal $XERR_i$ is then used in the final computation of step 107, which computes the value of the voltage command signal $XVC_i$ to be converted by the DAC converter 161 to the drive voltage $V_{wfm}$ for the wheel slide feed motor WFM. As illustrated in FIG. 12, the value of this command signal $XVC_i$ is the value of the error signal $XERR_i$ multiplied by a keyed-in proportionality or gain factor GX.

When the "JOG" switch is not closed—e.g., due to intermittent operation of the switch by the operator—step 103 produces a negative response which causes the system to set $\Delta X_i$ to zero at step 122. As will be appreciated from the foregoing description, the wheel slide feed motor WFM will be de-energized, thus simply holding the wheel slide at a fixed position, as long as $\Delta X_i$ is zero.

It can be noted here that the computations just described as being carried out at steps 105–107 are the same whenever the wheel slide feed motor WFM is energized in any of the modes 1, 3, 5, 6 or 7. The value of $\Delta X_i$ changes depending upon the mode in which the system is operating at any given instant and, as indicated previously, this change in the value of $\Delta X_i$ is effected by simply changing the value of the commanded feed rate signal XFRA.

Returning now to the main program in FIG. 11, after the mode 1 flag MD1 has been set at step 007, the system proceeds to step 008 which displays another prompting message to the operator, this time instructing the operator to "jog until XRLS is closed." It will be recalled that XRLS is the limit switch which establishes the retracted reference position of the wheel slide, and when the wheel slide is in this reference position the distance from the rotational axis of the workpiece to the rotational axis of the grinding wheel is a known value represented by the signal XSO. In response to the prompting message at step 008, the operator proceeds to use the "JOG" switch to retract the wheel slide until it closes the limit switch XRLS, which is sensed at step 009 and results in the setting of the flag DISABL at step 010. It is this flag DISABL which is read at step 101 of the X-axis subroutine of FIG. 12, and when this flag is set the system immediately exits the X-axis subroutine at step 108 and returns to the main program. This ensures that the wheel slide feed motor is de-energized when the switch XRLS is closed, even if the operator accidentally keeps the "JOG" switch closed.

With the wheel slide now in its retracted reference position, the system proceeds to step 011 which sets the starting values of the actual wheel slide position signal XAP and the commanded wheel slide position signal XCP equal to the keyed-in value MACHREF, and it also sets the value of the initial commanded position signal XCPI equal to the same value. The value of MACHREF represents the distance from the rotational axis of the workpiece to the face of a retracted grinding wheel which has a starting radius of a preselected value, e.g., 12 inches, which is normally selected to be the radius of the largest wheel that might be used in the machine. If the wheel actually has a smaller radius, of course the starting values of XAP and XCP must be adjusted accordingly, in a manner to be described below.

From step 011, the system proceeds to step 012 which clears the flag DISABL, after which another prompting message is displayed at step 013, instructing the operator to "jog wheel to kiss known part". The operator thus proceeds to use the "JOG" switch again, this time slowly advancing the grinding wheel until it just lightly engages the workpiece. This is still part of mode 1, i.e., the flag MD1 is still on, and thus the subroutine of FIG. 12 still sets the commanded feed rate XFRA at the "jogging" rate FJOG, though this value FJOG will now be negative because the operator will be moving the "JOG" switch to the "forward" position. During the advancing jogging movement of the wheel slide, the values of XAP and XCP, which were both initially set at the value of MACHREF at step 011, are continually changed at steps 105 and 107; that is, in each ΔT of jogging movement, XCP is reduced by the value of ΔX, and XAP follows with the same change due to the changing resolver signal XR as the wheel slide is advanced in response to the changes in XCP.

The operator is next instructed to "perform part reference", which is the prompting message displayed at step 014. The operator initiates this procedure by simply closing a "PTREF" switch, which is another one of the switches 157 in FIG. 9. Step 015 of the main program senses when the PTREF switch is closed, maintaining the prompting message at step 014 in the meantime, and clears the flag MD1 at step 016 when closure of the PTREF switch is detected. This is the end of mode 1.

Immediately after clearing the flag MD1, the system sets the flag DISABL at step 017, and then sets the "mode 2" flag MD2 at step 018. In mode 2, the wheel slide feed motor WFM is disabled while the system (1) adjusts the values of both XCP and XAP to the value of the signal KNORAD representing the known radius KNORAD of the master workpiece and (2) computes the actual value of the initial wheel radius RADW by subtracting (a) the known workpiece radius KNORAD and (b) the distance REFCH traversed by the wheel slide during its advancing movement, from (c) the original distance XSO between the rotational axes of the workpiece and the grinding wheel. As indicated at step 019 in FIG. 11, which is the step at which the mode 2 operations are performed, the value of REFCH is computed as the difference between the final value of XCP at the end of mode 1, when the wheel first engages the workpiece, and the initial value XCPI set at step 011 when the wheel was in its retracted reference position.

The value XSO is one of the keyed-in constants stored in the memory and represents the distance between the rotational axes of the workpiece and the grinding wheel when the grinding wheel is in its retracted reference position set by the closing of the reference limit switch XRLS. This distance XSO is the sum of three dimensions, namely, the known radius KNORAD of the master workpiece, the starting wheel radius RADWI, and the original gap REFCH between the faces of the workpiece and the grinding wheel with the grinding wheel in its retracted reference position. Thus, by subtracting two of these dimensions, namely, the original gap REFCH and the known workpiece radius KNORAD, from XSO, the remaining value represents the actual initial radius RADWI of the grinding wheel. Also, it is known at this point that the distance between the grinding wheel face and the rotational axis of the master workpiece is exactly equal to the known radius KNORAD of the master workpiece, and thus the values of the signals XAP and XCP representing the actual and commanded positions of the grinding wheel face should both be exactly the same as the value of KNORAD. Thus XAP and XCP are both initialized at this value. Finally, a gage reference signal PTRADI is set equal to the known workpiece radius KNORAD being read by the gage at this time.

This is the end of mode 2, which completes the "set up" procedure, and the main program proceeds to step 020 which clears the flag MD2 and again clears the flag DISABL. The system then proceeds to step 021 where a "mode 7" flag MD7 is set. In this mode, which is repeated at the end of the grinding of each workpiece, the grinding wheel is retracted from its known position XAP=KNORAD to a predetermined "parked" position so that the operator has enough room to remove the master workpiece and insert the actual workpiece to be ground. This actual workpiece will, of course, usually have a radius slightly different from that of the master workpiece, but the actual position of the face of the grinding wheel relative to the rotational axis of the workpiece is still precisely known because all movements of the wheel from its known starting position XAP=KNORAD are continually measured by monitoring the resolver signals XR and updating the value of the actual position signal XAP.

In order to retract the grinding wheel to the predetermined "parked" position, step 022 of the main program sets a commanded wheel slide "end point" position XCEP for the desired park position which is represented by the keyed-in value RETRP. Retracting movement of the wheel slide is effected by the X-axis subroutine of FIG. 12 which in mode 7 proceeds through steps 101, 102, 109, 110, 111, 112, and finally detects the presence of the flag MD7 at step 113. The subroutine then proceeds to step 114 which sets the commanded feed rate signal XFRA equal to a keyed-in value FRT representing the desired velocity of the wheel slide during retracting movement of the grinding wheel to the "parked" position. As described previously, the value of XFRA determines the actual rate of movement of the wheel slide by determining the value of $\Delta X_i$ at steps 106 and 107.

Step 023 of the main program senses when the grinding wheel has reached the desired "parked" position by detecting when the difference between the set "end point" position XCEP and the current commanded position $XCP_i$ is less than the value of $\Delta X_i$. When the answer at step 023 is affirmative, step 024 sets the value of the commanded position signal $XCP_i$ for step 107 of the subroutine of FIG. 12 equal to the value of the "end point" position signal XCEP, which causes the retracting movement of the wheel slide to be terminated at the position represented by XCEP, which is the desired "parked" position represented by the keyed-in value RETRP. The main program then clears the flag MD7 at step 025, thereby ending mode 7, and proceeds to step 026 where another prompting message is displayed for the operator, this time instructing the operator to "turn off part motor and load unground workpiece".

After an appropriate delay, allowing time for the operator to load the actual workpiece to be ground, the system proceeds to step 027 which displays another prompting message, instructing the operator to "start workpiece motor and perform cycle start." The "cycle start" operation by the operator, which initiates the actual grinding of the workpiece, is accomplished by simply closing a "cycle start" switch, which is another one of the switches 157 in FIG. 9. Step 028 of the main program senses when the operator has closed the "cycle start" switch, and then proceeds to set the "mode 3" flag MD3 at step 029. This initiates mode 3, in which the wheel slide is advanced from its "parked" position into "kissing" engagement with the workpiece to initiate grinding.

When the "mode 3" flag MD3 is on, the X-axis subroutine of FIG. 12 produces an affirmative response at step 109 and proceeds to step 115 which sets the commanded feed rate signal XFRA equal to a keyed-in value FGAP representing the rate at which it is desired to advance the grinding wheel into engagement with the workpiece. Here again, setting the commanded feed rate XFRA equal to the desired value automatically determines the wheel slide feed rate by determining the value of $\Delta X_i$ at steps 106 and 107 of the X-axis subroutine.

Steps 030 and 031 of the main program sense when the grinding wheel engages the workpiece. This is accomplished by setting the value of an "initial wheel torque" signal TORWI equal to the value of the current signal TORW received from the torque transducer 35 via the ADC 170, at step 030. At this point, of course, the grinding wheel has no load on it, and thus the value of the signal TORW is relatively low. From step 030, the main program advances to step 031 which senses when the actual grinding wheel torque $TORW_i$ exceeds a predetermined multiple, e.g., 1.3, of the initial wheel torque TORWI. When an affirmative response is produced at step 031, it is known that the grinding wheel has been brought into grinding contact with the workpiece, and the main program proceeds to step 032 where mode 3 is terminated by clearing the flag MD3. Mode 4 is then initiated at step 033 where a "mode 4" flag MD4 is set.

The clearing of the flag MD3 and the setting of the flag MD4 cause the X-axis subroutine of FIG. 12 to produce a negative response at step 109 and an affirmative response at step 110 in the next iteration cycle. The affirmative response at step 110 causes the subroutine to proceed to step 116 where the commanded feed rate signal XFRA is set at a keyed-in value GR representing the desired rough grinding rate. From step 116, the system proceeds through step 117, which will be described below, to step 118 where the current value of the signal $XAP_i$ is computed. Normally the value of this signal $XAP_i$ represents the actual position of the wheel face, and it is updated in each iteration interval ΔT by adding the current value of $\Delta XAP_i$ (representing the difference between the latest pair of resolver signals $XR_i$ and $XR_{i-1}$) to the previous value $XAP_{i-1}$. In mode 4, however, the value of $XAP_i$ is modified by adding a further value CORΔ in order to compensate for wheel wear. Although the commanded feed rate signal XFRA is set exactly equal to the value of the desired grind rate GR, this feed rate will not actually produce grinding at the rate GR unless some allowance is made for wheel wear. This allowance is provided by the factor CORΔ, the value of which is computed in the subroutine of FIG. 13.

Turning now to FIG. 13, this subroutine uses the gage signal GS to continually update the signal $PTRAD_i$ representing the actual workpiece radius, which is not only one of the values needed to compute the value of the wheel wear compensation factor CORΔ used in mode 4, but also is the value used to compute the value of the "distance to go" signal $DTG_i$ in modes 4 and 5. Thus, the subroutine of FIG. 13 is active only during modes 4 through 6, which are the only modes during which grinding is taking place.

The first step 200 of the subroutine of FIG. 13 detects whether any of the flags MD4, MD5 or MD6 is on, and if the answer is negative the system immediately exits from this subroutine. If the answer is "yes" at step 200, the system proceeds to step 201 where the value of the gage signal GS is read from the gage ADC 169. A running average of the gage signal value GS, for the last ten ΔT's, is continually updated and stored as the value $GS_i$ at step 202, and this value is then used at step 203 to update the actual workpiece radius value $PTRAD_i$ by adding the latest average gage signal value $GS_i$ to the original gage reference value PTRADI.

At step 204 the subroutine tests the flag MD4, and if the answer is negative it means that the system is in mode 5 or 6. Both of these modes 5 and 6 require only the updated workpiece radius value $PTRAD_i$, not the wheel wear compensation factor CORΔ, and thus the system exits from the subroutine of FIG. 13 in response to a negative answer at step 204 and returns the system to the main program at step 206. An affirmative response at step 204 means that the system is in mode 4, and thus the subroutine proceeds to step 205 where the value of the compensation factor CORΔ is computed. More specifically, step 205 first moves an error signal $RADERR_i$ to memory location RADERRI (thereby "saving" that signal), and then computes a new value for the error signal $RADERR_i$ by subtracting the current wheel position $XAP_i$ from the current workpiece radius $PTRAD_i$. Thus, the value of $RADERR_i$ represents the current difference between the actual workpiece radius as represented by $PTRAD_i$ and the current actual wheel face position as represented by $XAP_i$.

The error signal $RADERR_i$ is used to compute conventional "PID" control factors $PFACTOR_i$, $IFACTOR_i$ and $DFACTOR_i$ which, as is well known, represent proportional, integral and derivative control terms which are used to control the wheel slide feed motor WFM in a stable manner. Such "PID" control of servo motors is well known per se and need not be explained in detail herein. As indicated in FIG. 13, the proportional factor $PFACTOR_i$ is computed by multiplying the error signal $RADERR_i$ by a keyed-in gain factor GP; the integral factor $IFACTOR_i$ is computed by multiplying the error signal $RADERR_i$ by a keyed-in integral gain factor GI and adding the resulting product to the previous value $IFACTOR_{i-1}$; and the derivative factor $DFACTOR_i$ is computed by subtracting the previous error signal value RADERRI from the current error signal $RADERR_i$ and multiplying the resulting difference by a keyed-in derivative gain factor GD. The value of $CORΔ_i$ is then the sum of the three factors $PFACTOR_i$, $IFACTOR_i$, and $DFACTOR_i$.

Returning now to the X-axis subroutine of FIG. 12, it will be noted that the value $CORΔ_i$ is used at step 117 to continually update the signal $RADW_i$ representing the current actual wheel radius. This value $RADW_i$ is updated by subtracting the current value of $CORΔ_i$ from the previous value $RADW_{i-1}$ in each iteration interval. Step 117 also computes the value of a signal $DTG_i$ representing the distance to go to the desired final workpiece radius PTRADD. This value $DTG_i$ is the difference between the current value of the signal $PTRAD_i$ representing the actual workpiece radius and the desired final radius value PTRADD.

The final computation performed at step 117 determines the value of a signal $FD_i$ which represents the decelerating rate at which it is desired to feed the grinding wheel into the workpiece during finish grinding. As will be apparent from the ensuing description, this feed rate FD decelerates exponentially with time. As indicated at step 117 in FIG. 12, the value of $FD_i$ at any given instant is the current value of the "distance to go" signal $DTG_i$ multiplied by the ratio GR/DD1. The ratio GR/DD1 is actually a constant for any given grinding system, because GR is the constant value representing the rate at which it is desired to grind the workpiece in mode 4, and DD1 is the constant value representing the DTG value at which it is desired to initiate simultaneous truing. Since both of these values GR and DD1 are constants, the ratio GR/DD1 is obviously also a constant. The value of $DTG_i$, however, is constantly decreasing as the grinding operation reduces the workpiece radius closer and closer to the desired final radius PTRADD. Consequently, the value of $FD_i$ will also be constantly reducing, and this reduction occurs at an exponential rate with respect to time. The manner in which this exponentially decreasing feed rate value $FD_i$ is used to control the wheel slide feed rate will be described in more detail below in the description of mode 6.

The subroutine of FIG. 14 monitors the output torque TORW of the grinding wheel drive motor WM and varies the input voltage to this motor WM according to the value of TORW and a keyed-in constant GW. The rotational velocity PTV of the workpiece is kept constant at a set point value PTVD by the subroutine of FIG. 16 to be described below, and the grinding rate is held constant at the set point value GR by the X-axis subroutine described above. Consequently, the output torque TORW of the grinding wheel drive motor WM will increase as the grinding wheel dulls, due to the reduced efficiency of the abrasive grits of the grinding wheel in removing material from the workpiece 24. The subroutine of FIG. 14 senses this increase in torque TORW and decreases the rotational velocity WHV of the grinding wheel accordingly. This decrease in the grinding wheel velocity reduces the relative surface speed at the grinding interface, which causes the grinding wheel to re-sharpen aumomatically. As the wheel re-sharpens, the changes just described are reversed, increasing the rotational velocity of the grinding wheel.

The first step 300 of the VM subroutine of FIG. 14 reads the value of the signal $WHV_i$ which is the digital counterpart of the analog signal $\omega_w$ received from the grinding wheel tachometer 36. This signal represents the actual speed of the grinding wheel at any given instant. Step 301 computes and stores a running average WHVAV of the speed signal WHV over, for example, the last ten $\Delta T$'s, using a "stacking" procedure which continuously stores the latest ten readings, adding the new value $WHV_i$ and discarding the oldest value $WHV_{i10}$ in each $\Delta T$. The ten values stored at any given time are summed and divided by ten to provide the desired average value $WHVAV_i$. This averaging procedure is used simply to enhance the reliability of the value of WHV by using a running average of the last ten signal values rather than relying on the single value of only the latest signal.

Steps 302, 303 and 304 of the WM subroutine read the flags MD4, MD5 and MD6, respectively, to determine whether the system is in mode 4, 5 or 6. Each of these modes has a different grinding feed rate and, therefore, a different rate M' of metal removal from the workpiece at the grinding interface. Accordingly, a gain factor GW is set to a different value for each different grinding mode, i.e., modes 4, 5 and 6. This gain factor GW controls the magnitude of the change effected in the grinding wheel velocity set point value WHVD in response to any given change in the output torque TORW of the grinding wheel drive motor WM.

To change the value of the gain factor GW for the three different grinding modes 4, 5 and 6, steps 305, 306 and 307 of the subroutine of FIG. 9 set GW to three different values GW1, GW2 and GW3 in response to affirmative answers at steps 302, 303 and 304, respectively. The values GW1, GW2 and GW3 are all keyed-in constants which are changed for different grinding operations.

After setting GW to the appropriate value, the subroutine of FIG. 14 proceeds to step 308 where it reads the current value of the signal $TORW_i$ which is the digital counterpart of the analog signal $TOR_w$ received from the torque sensor 35 on the output of the drive motor WM. From step 308 the WM subroutine advances to step 309 where it carries out three computations. The first computation determines the current desired value $WHVD_i$ of the rotational velocity of the grinding wheel by multiplying the current value $TORW_i$ by the gain factor GW set at step 305, 306 or 307. The second computation at step 309 computes an error signal $WHVERR_i$ as the difference (if any) between the computed set point value $WHVD_i$ (in rpm) and the latest average value $WHVAV_i$. This error signal $WHVERR_i$ is then used to effect any adjustment required in the command signal VWM which controls the driving voltage $V_{wm}$ supplied to the grinding wheel drive motor WM. More specifically, the error signal $WHVERR_i$ is used to make an integrating correction by multiplying it by the gain factor GW, and then adding the resulting product to the value of the command signal $VWM_{i-1}$ for the previous $\Delta T$. The resulting new value $VWM_i$ of the command signal will produce an actual grinding wheel speed WHV equal to the current set point value $WHVD_i$. The command signal will remain at this value unless and until there is a further deviation of either the actual speed as represented by the signal $WHV_i$ or the set point speed value $WHVD_i$. Step 310 of the subroutine returns the system to the main program.

When the control system is not in any of the modes 4, 5 or 6 while the drive motor is energized, step 304 of the WM subroutine yields a negative answer. This advances the system to step 311 which sets the command signal $VWM_i$ equal to the keyed-in value VWMI representing a suitable "idling" speed for the wheel drive motor WM when no grinding is taking place.

It will be recalled that the decelerating feed rate $FD_i$ is continually computed, as a function of the decreasing "distance to go" value $DTG_i$, throughout mode 4 of the X-axis subroutine (FIG. 12). The value of $FD_i$ continuously decreases at an exponential rate, and step 034 of the main program determines when the value of $FD_i$ has been reduced to the value GR representing the desired grinding rate during mode 4. An affirmative response at step 034 is used to clear the flag MD4 at step 035 and to set the "mode 5" flag MD5 at step 036. Mode 4 is thus terminated, and mode 5 is started.

In mode 5, the X-axis subroutine of FIG. 12 produces an affirmative response at step 111, thereby advancing the system to step 119 which continues the same computations of $DTG_i$ and $FD_i$ which were carried out at step 117 in the mode 4 channel. From step 119, the system proceeds to step 120 where the value of the commanded feed rate signal XFRA is set to a new value $FD_i$. This new feed rate value is intended to carry out finish grinding by advancing the wheel into the workpiece at the decelerating feed rate $FD_i$.

From step 120 the system proceeds through step 105 (described previously) to step 106 where the new value of the commanded feed rate signal XFRA is used to compute the new value of $\Delta X_i$. The new value of $\Delta X_i$ is then used at step 107 to control the feed rate of the wheel slide in the same manner described previously.

Mode 5 is terminated, and mode 6 initiated, when the decelerating wheel slide feed rate $FD_i$ reaches a keyed-in value FGRFIN representing a desired finish grinding feed rate for the final increment of finish grinding which reduces the workpiece radius to the desired final size represented by the value PTRADD. Step 037 of the main program determines when the value of $FD_i$ has been reduced to the keyed-in value FGRFIN, and when this condition occurs step 037 produces an affirmative response which advances the system to step 038 to clear the flag MD5, and then on to step 039 which sets the flag MD6.

In the X-axis subroutine of FIG. 12, the setting of the "mode 6" flag MD6 advances the system from step 112 to step 121 where the feed rate command signal XFRA is set to the keyed-in value FGRFIN. From step 121, the system proceeds on through the previously described steps 105 through 107.

During the finish grinding mode 6, the subroutine of FIG. 13 continues to update the actual workpiece radius value $PTRAD_i$ by subtracting the gage signal value $GS_i$ from the original gage reference value PTRADI. This workpiece radius value $PTRAD_i$ is used to determine when finish grinding should be terminated, by determining when the actual workpiece radius value $PTRAD_i$ has been reduced to the desired final workpiece radius value PTRADD. This comparison is carried out at step 040 of the main program, and when this step produces an affirmative answer, the flag MD6 is immediately cleared at step 041. The main program then proceeds to step 042 which returns to step 021 where the flag MD7 is set. This causes the wheel slide drive motor WFM to retract the grinding wheel to its "parked" position in the same manner described previously.

A subroutine for periodically re-referencing the values of XAP, XCP and RADW during modes 5 and 6 is illustrated in FIG. 15. This subroutine is entered at step 400, which determines whether either of the flags MD5 or MD6 is on. If the answer is "no", the system is not in either mode 5 or mode 6, and thus it is returned to the main program at step 402. If either of the flags MD5 or MD6 is on, step 400 produces an affirmative response which advances the subroutine to step 401 to perform the series of operations illustrted in FIG. 15. The first operation at step 401 sets the value of a signal XAPI equal to the current value of the actual position signal $XAP_i$, and the second operation re-references the value of XAP to a new value $XAP_{new}$ equal to the current actual workpiece radius value $PTRAD_i$. The latter operation ensures that the value of the wheel face position signal XAP corresponds to the actual workpiece radius value as determined from the gage signal. The rationale for this re-referencing is that the actual workpiece radius as determined from the gage signal should be the most accurate indicator of where the wheel face is actually positioned at any given instant.

After re-referencing XAP, step 401 proceeds to compute a re-referencing value REFCH by computing the difference (if any) between $XAP_{new}$ and XAPI. The resulting value REFCH is then used to re-reference both XCP and RADW. More specifically, as indicated at step 401, a new value for XCP is computed as the sum of $XCP_i$ and REFCH, and a new value for RADW is computed by subtracting REFCH from the current value $RADW_i$. This re-referencing subroutine is iterated at timed intervals of, e.g., 0.5 second.

It will be recalled that the workpiece drive motor PM was started at step 004 of the main program. The subroutine for producing the command signal VPM for controlling the driving voltage $V_{pm}$ for the motor PM is illustrated in FIG. 16. The first step 500 of this subroutine reads the value of the signal PTV which is the digital counterpart of the analog signal $\omega_p$ received from the workpiece tachometer 39 via the ADC 167. This signal PTV 44 presents the actual speed of the workpiece at any given instant. Step 501 computes and stores a running average PTVAVG of the speed signal PTV over, for example, the last ten ΔT's. This is a conventional averaging technique well known to those skilled in the art, and can be performed, for example, by the usual "stacking" procedure which continuously stores the lastest 10 readings, adding the new value $PTV_i$ and discarding the oldest value $PTV_{i-10}$ in each ΔT. The ten values stored at any given time are summed and divided by ten to provide the desired average value PTVAVG.

At step 502, the subroutine of FIG. 16 computes an error signal $PTVERR_i$ as the difference (if any) between the keyed-in set point speed value PTVD (in rpm) and the latest average value $PTVAVG_i$. This error signal $PTVERR_i$ is then used to effect any adjustment required in the command signal VPM which controls the driving voltage $V_{pm}$ supplied to the drive motor PM. More specifically, the error signal $PTVERR_i$ is used to make an integrating correction by multiplying it by a proportionality or gain factor GPV (one of the keyed-in constants), and then adding the resulting product to the value of the command signal $VPM_{i-1}$ for the previous ΔT. The resulting new value $VPM_i$ of the command signal will tend to restore the actual workpiece speed PTV to the set point speed PTVD. The command signal will remain at this new value, holding the actual workpiece speed at the set point speed, unless and until there is a further deviation of the actual speed from the set point speed. Step 503 of this subroutine returns the system to the main program.

FIG. 17 illustrates the subroutine for controlling the hydraulic pressure supplied to the steadyrest cylinders 105 and 106 for the particular grinding operation described above in connection with FIG. 8. To facilitate an understanding of this system, it will be assumed that the upper and lower steadyrests in each pair are located 180° and 90° away from the grinding interface so that they directly oppose the normal and tangential forces $F_N$ and $F_T$, respectively, as illustrated in FIG. 2. This subroutine is entered at step 600 which reads the mode flags to determine whether any of the mode flags MD3, MD4, MD5 or MD6 is set. If the answer is negative, the subroutine proceeds to step 601 where the values of $PDV1_i$, $PDV2_i$, $PDV3_i$, $PDH1_i$, $PDH2_i$ and $PDH3_i$ are all set to zero; this prevents the application of any pressure to the pistons of both the vertical and horizontal steadyrests in all three pairs of steadyrests along the length of the workpiece. As a result, all the steadyrests remain retracted away from the workpiece due to the mechanical force of the return springs in the steadyrest cylinders.

If an affirmative answer is yielded at step 600, the subroutine of FIG. 17 proceeds to step 602 to determine whether the particular mode flag set is the mode 3 flag MD3. If the answer is "yes", the system proceeds to step 603 where the pressure control signals for the three vertical steadyrests, i.e., $PDV1_i$, $PDV2_i$ and $PDV3_i$, are set to the value:

$$\frac{WF \times \frac{R1}{R2} + FC}{A} \tag{50}$$

(where the value of FC is a keyed-in value) and the pressure control signals for the three horizontal steadyrests, i.e., $PDH1_i$, $PDH2_i$ and $PDH3_i$, are set to the value:

$$\frac{BIAS + FC}{A} \tag{51}$$

(where the value of A is a keyed-in value).

The pressures exerted on the steadyrests by these values causes the steadyrests to be advanced into engagement with the workpiece. In the case of the vertical steadyrests, the factor WF is the constant that causes the steadyrests to be urged against the workpiece with pressure sufficient to counterbalance the tendency of the workpiece to sag due to its own weight. In the case of the horizontal steadyrests, the factor BIAS is a constant that causes the steadyrests to just lightly engage the workpiece.

If the answer at step 602 is "no", indicating that the system is in mode 4, 5 or 6, the system advances to step 604 which reads the current values of the grinding wheel input torque $TORW_i$, the workpiece radius $PTRAD_i$, the workpiece speed $PTV_i$, and the wheel speed $WHV_i$, each of which can be averaged by the usual "stacking" procedure if desired. The subroutine then advances to step 605 where the current value of the grinding wheel radius $RADW_i$ is computed as the value $RADW_{i-1}$ in the previous iteration minus the current value of $CORA_i$ representing the incremental reduction in grinding wheel radius in the latest iteration interval.

At step 606, the subroutine of FIG. 17 computes the value of the tangential force FT using Equation (4), with the wheel input torque being represented by the difference between the current average torque value $TORWAV_i$ and the idling torque value TORWI. This equation requires only the wheel input torque value $TORWAV_i$ (derived from the analog signal $TOR_w$ from the torque transducer 35), the idling torque value TORWI, and the workpiece radius value $RADW_i$ from step 605.

From step 606, the subroutine advances to step 607 which determines whether the current tangential force value $FT_i$ computed at step 606 is greater than the tangential force component $F_{Tmr}$ associated with metal removal, when grinding is taking place. A negative answer at step 607 means that grinding is not taking place, and thus the subroutine returns to step 603 to maintain the pressure control signals at the same values described above.

A positive answer at step 607 means that grinding is taking place, and advances the subroutine to step 607A to set a flag GRF, and then on to step 608 where the value of the normal force $F_N$ is computed using Equation (17). As can be seen in FIG. 17, this equation requires the tangential force component $FT_i$ computed at step 607; the current workpiece radius value $PTRAD_i$ and current rotational velocity values $PTVAV_i$ and $WHVAV_i$ for the workpiece and wheel, as read at step 604; the current wheel radius value $RADW_i$ computed at step 605; and the keyed-in constants COF, KM, L and GR.

After both the tangential and normal force values FT and FN have been determined, at steps 606 and 608, the system must determine where the grinding wheel is located along the length of an elongated workpiece so that it knows which, if any, of the steadyrests is to be force-controlled. It will be recalled that the steadyrests are located at bearing surfaces B2, B4 and B6 in the example of FIG. 8, and thus the respective steadyrests are force-controlled when these three surfaces are being ground. The Z-axis control system which controls the Z-axis motor ZFM sets corresponding flags GP1, GP2 and GP3 when the grinding wheel is aligned with the respective steadyrests S1 (bearing surface B4), S2 (bearing surface B2), and S3 (bearing surface B6), and these flags are read by the subroutine of FIG. 17 at steps 609, 611 and 613, respectively.

Thus, at step 609 the subroutine of FIG. 12 determines whether the first flag GP1 is on, and if the answer is negative the system proceeds to step 611 to read the second flag GP2. If the answer is negative again, step 613 is reached where the third flag GP3 is read. A negative answer here indicates that the grinding wheel is at one of the remaining four work positions, i.e., at bearing surface B1, B3, B5 or B7. This stage is reached only after the bearing surfaces B4, B2 and B6 have been ground and thus the three steadyrest pairs S1, S2, and S3 are already locked up. As a result, no force control is required and the subroutine reverts to the main program at step 615.

If the answer at step 609 is positive, i.e., the flag GP1 is indeed on, the subroutine proceeds to step 609A to read the flag GRF and thereby determine whether grinding is taking place; that is, even though the grinding wheel has been moved into alignment with a given surface of the workpiece, the wheel might not yet have been fed into engagement with the workpiece. If the answer at step 609A is negative, the system advances to step 609B where the tangential force value $FT_i$ is computed using Equation (4) with a keyed-in preliminary wheel torque value TORWP representing the theoretical wheel torque $TOR_w$ for the set grind rate GR and wheel speed $\omega_w$. The subroutine then proceeds to step 610 and computes the desired values of the two pressure control signals PDV1 and PDH1. More specifically, when the grinding wheel is at the bearing surface B4, as indicated by the flag GP1, the desired value of the steadyrest pressure control signal PDH1 for the upper steadyrest of S1 is computed using Equation (47), and the value of the corresponding signal PDV1 for the lower steadyrest of S1 is computed using Equation (48), as indicated at step 610.

Step 611 yields an affirmation answer when the grinding wheel is positioned at bearing surface B2, which means that the steadyrest pair S2 should be force-controlled and the steadyrest triplet S1 should be locked up when grinding is taking place. Step 611A determines whether grinding is taking place by reading the flag GRF; if the answer is negative, step 611B computes the value of $FT_i$ using TORWP, as at step 609B. If the answer is affirmative at step 611A, the desired values of the pressure control signals PDV2 and PDH2 are computed at step 612.

In order to lock up the steadyrest pair S1 that was force-controlled during the grinding of surface B4, step 612 also sets the signal PDV1 to a LOCK value which holds the lower steadyrest 100 of set S1 firmly against its mechanical stop, and sets a signal WDGCY1 to "1" to actuate the air cylinder 119 that advances the wedge 117 to lock the upper steadyrest 101 of set S1. Step 612 also sets a signal TOPSR1 to "1" to move the top steadyrest of set S1 to its advanced position. These are the conditions that prevail during the grinding of the bearing surface B4.

If negative answers are received at both steps 609 and 611, the subroutine of FIG. 17 proceeds to step 613 to determine whether the flag GP3 is set. If an affirmative response is produced at this step, the system proceeds to step 613A to determine whether grinding is taking place by reading the flag GRF. A negative response at step 613A advances the subroutine to step 613B where the value of FT is computed in the same manner described above in connection with steps 609B and 611B. An affirmative response at step 613A advances the system directly to step 614, to generate the values needed to force-control the steadyrest pair S3 and to lock up the steadyrest triplets S1 and S2.

To attain these results, the desired values of the steadyrest pressure control signals PDH3 and PDV3 for the steadyrest pair S3 are computed using Equations (47) and (48) as described above. To maintain the steadyrest pairs S1 and S2 fixed in their advanced positions against the previously ground bearing surfaces B4 and B2, step 614 also (1) sets the signals PDV1 and PDV2 to LOCK values which hold the lower steadyrests 100 of sets S1 and S2 firmly against their mechanical stops, (2) sets signals WDGCY1 and WDGCY2 to "1" to actuate the cylinders that advance the wedges to lock the upper steadyrests 101 of sets S1 and S2, and (3) sets signals TOPSR1 and TOPSR2 to "1" to move the top steadyrests of sets S1 and S2 to their advanced positions. These are the conditions that prevail during the grinding of the bearing surface B6.

From any one of steps 610, 612 or 614, the subroutine of FIG. 17 returns to the main program at step 614.

As described above in connection with FIG. 1, the Z-axis movement of the slide ZS permits a long workpiece 24 to be indexed along the grinding wheel 20 for grinding successive areas of the workpiece surface. Movement of the slide ZS is controlled by the Z-axis feed motor ZFM which can be operated manually or by a subroutine of the same computer control system which controls the other parameters of the grinding system. Each time a grinding plunge is completed, the grinding wheel 20 is retracted slightly to disengage the wheel from the workpiece; the Z-axis motor ZFM is energized to index the workpiece to the next grinding position; the appropriate flags GP1, GP2 and GP3 are turned on or off; and step 043 of the main program causes the main program to be re-entered at step 029 (mode 3) as long as step 042 determines that the flag GP3 is off (indicating that the grinding of the last surface of the workpiece has not yet been effected). This process is repeated at the end of each grinding plunge until all desired surfaces of the workpiece have been ground.

When the last workpiece surface has been ground, the Z-axis control system sets the flag GP3, which yields an affirmative answer at step 042 of the main progam and causes the main program to be re-entered at step 021 (mode 7) instead of step 029 (mode 3). The workpiece is then removed, and the Z-axis motor ZFM is energized in the reverse direction to return the slide ZS to its starting position for grinding a new workpiece.

The system described above does not take into account the power consumed due to friction at the faces of the steadyrest pads 103, 104 due to the drag of these stationary surfaces on the workpiece. It has been found that these frictional losses are sufficiently small that they can usually be ignored without any significant adverse effect on the grinding operation. If desired, however, the power consumed by frictional losses at the steadyrest pads could be calculated, or even estimated, and subtracted from the power value used to compute $F_{Tf}$.

I claim as my invention:

1. A method of grinding a workpiece which is susceptible to deflection and/or deformation when grinding is carried out by relatively infeeding a grinding wheel to keep the wheel face and work surface in relative rubbing contact at an interface region, said method comprising
    continuously determining the force exerted by the wheel on the workpiece at the interface region, independently of the position of the workpiece surface, as grinding conditions change,
    continuously applying to the workpiece at least one counterbalance force which in equivalent effect is opposite in sense to said determined force, and
    variably controlling said counterbalance force to maintain its effective magnitude equal to the magnitude of said determined force.

2. A method as set forth in claim 1 wherein at least two counterbalance forces are applied to the workpiece at different circumferential positions, the resultant of said counterbalance forces opposing said determined force and having a magnitude equal to the magnitude of said determined force.

3. A method as set forth in claim 1 which includes the step of continuously applying to the workpiece at least one force to counter any tendency of the workpiece to sag due to its own weight.

4. A method as set forth in claim 1 wherein said workpiece is much longer than said grinding wheel in the axial direction, said workpiece and grinding wheel are successively indexed relative to each other in the axial direction for grinding the workpiece surface at different axial locations, multiple counterbalance forces are applied to an elongated workpiece at spaced locations along the length of the workpiece, and said counterbalance forces are controllably altered each time said workpiece and grinding wheel are indexed relative to each other so that the cummulative bending moments produced by said counterbalance forces are equal and opposite to the bending moments produced by said determined force exerted on the workpiece by the grinding wheel.

5. A method as set forth in claim 1 wherein said workpiece is elongated in the direction of its axis, said grinding force and said counterbalance force are applied to the workpiece at different longitudinal positions, along the axis of the workpiece and said counterbalance force is controlled so that the sum of the bending moments exerted on the workpiece by said grinding force and said counterbalance force is substantially zero.

6. A method as set forth in claim 1 for grinding multiple surfaces along the length of an elongated workpiece, and including the steps of
    terminating the grinding of each of said multiple surfaces when that portion of the workpiece has been ground to a desired final size, and
    supporting selected ones of the ground surfaces in fixed positions during the grinding of other surfaces along the length of the workpiece.

7. A method as set forth in claim 6 wherein said counterbalance force is applied to said workpiece by a steadyrest, and which includes the steps of
    monitoring the actual size of a first surface of the workpiece during the grinding of said first surface,
    terminating the grinding of the workpiece when said first surface of the workpiece has been ground to a desired size, and
    locking said steadyrest in a fixed position determined by the position of said first surface of the workpiece when ground to said desired size.

8. A method as set forth in claim 7 wherein the actual size of said first surface of the workpiece is monitored by an in-process gage, so that said fixed position in which said steadyrest is locked is determined by said gage.

9. A method as set forth in claim 1 wherein the control of said counterbalance force is delayed so that the equalizing of the magnitudes of said counterbalance force and said determined force lags slightly behind changes in said determined force.

10. A method of counterbalancing the variable grinding force $F_N$ applied to a workpiece by a rotating grinding wheel, in a direction normal to the face of the grinding wheel, during the course of grinding action resulting from the rotating grinding wheel being relatively infed with relative rubbing contact of the wheel face and the workpiece surface, said method comprising continuously determining the variable force $F_T$ exerted by the wheel on the workpiece in a direction tangential to the wheel face at the region of relative rubbing contact, continuously determining that force component $F_{Tmr}$, in part making up the tangential force $F_T$, which acts to remove material from the workpiece, continuously determining that force component $F_{Tf}$, in part making up the tangential force $F_T$, which acts to create heat due to friction of said relative rubbing contact, continuously determining the variable force $F_N$ exerted by the wheel on the workpiece in a direction normal to the wheel face at the region of relative rubbing contact, and applying to the workpiece a counterbalancing force $F_S$ which is maintained equal to, and opposite in direction to, said force $F_N$.

11. A method as set forth in claim 10 wherein said force $F_T$ is determined from the relationship $$F_T = \frac{TOR_w}{R_w}$$

where $TOR_w$ is the torque applied to rotationally drive the grinding wheel, and $R_w$ is the radius of the grinding wheel.

12. A method as set forth in claim 10 wherein said force component $F_{Tmr}$ is determined from the relationship $$F_{Tmr} = \frac{K_m \times M'}{S_r}$$

where $K_m$ is a predetermined material removal work function constant for the material of the workpiece having units of work per unit volume removed, $M'$ is the volumetric rate of removal of material from the workpiece, and $S_r$ is the relative surface velocity of the rubbing contact of the wheel and workpiece.

13. A method as set forth in claim 10 wherein said force component $F_{Tf}$ is determined from the relationship $$F_{Tf} = F_T - F_{Tmr}$$

14. A method as set forth in claim 10 where said force component $F_N$ is determined from the relationship $$F_N = \frac{F_{Tf}}{C_f}$$

where $C_f$ is a predetermined constant representing a coefficient of friction for rubbing contact of the wheel and the workpiece.

15. A method as set forth in claim 10 wherein said step of determining said force $F_T$ includes the steps of sensing and signaling the value of the torque $TOR_w$ applied to rotationally drive the grinding wheel, and utlizing said signaled value to represent the value of said tangential force $F_T$ as $$F_T = \frac{TOR_w}{R_w}$$

16. A method as set forth in claim 10 which includes the step of applying to the workpiece a counterbalancing force which is maintained equal to, and opposite in direction to, said force $F_T$.

17. A method set forth in claim 10 wherein said step of determining said force component $F_{Tmr}$ includes the steps of sensing and signaling the value of the volumetric rate of removal $M'$ of material from the workpiece, and utilizing said signaled value to represent the value of said force component $F_{Tmr}$ as $$F_{Tmr} = \frac{K_m \times M'}{S_r}$$

18. A method set forth in claim 10 wherein said workpiece is a cylindrical workpiece of length L and is rotationally driven about its cylindrical axis during the course of the grinding, and said step of determining said force component $F_{Tmr}$ comprises sensing and signaling the values of the rotational speeds $\omega_w$ and $\omega_p$ of the wheel and the workpiece, respectively, producing signals which represent the radii $R_w$ and $R_p$ of the wheel and the workpiece, respectively, producing a signal which represents the rate of reduction $R'_p$ of the radius of the workpiece due to the grinding action, and utilizing said signals representing $\omega_w$, $\omega_p$, $R_w$, $R_p$, and $R'_p$ to represent the value of said force component $F_{Tmr}$ as $$F_{Tmr} = \frac{K_m \times L \times R_p \times R'_p}{(R_w \times \omega_w \pm R_p \times \omega_p)}$$

19. A method as set forth in claim 10 wherein said force $F_N$ is determined from the relationship $$F_N = \frac{1}{C_f}\left(\frac{TOR_w}{R_w} - F_{Tmr}\right)$$

20. A method of counterbalancing the variable grinding force $F_T$ applied to a workpiece by a rotating grinding wheel, in a direction tangential to the face of the grinding wheel, during the course of grinding action resulting from the rotating grinding wheel being relatively infed with relative rubbing contact of the wheel face and the workpiece surface, said method comprising continuously determining the variable force $F_T$ exerted by the wheel on the workpiece in a direction tangential to the wheel face at the region of relative rubbing contact, applying to the workpiece a counterbalancing force $F_S$ which is maintained equal to, and opposite in direction to, said force $F_T$.

21. A method as set forth in claim 20 wherein said step of determining said force $F_T$ includes the steps of sensing and signaling the value of the torque $TOR_w$ applied to rotationally drive the grinding wheel, and utilizing said signaled value to represent the value of said tangential force $F_T$ as $$F_T = \frac{TOR_w}{R_w}$$

22. A method of determining, from instant to instant, the changeable normal force $F_N$ which a grinding wheel exerts on a workpiece during a grinding operation, the material removal work function constant $K_m$ for the material of the workpiece being known and the sliding coefficient $C_f$ of friction for the workpiece and wheel materials being known, said method comprising determining and signaling the magnitude of the total tangential force $F_T$ exerted by the wheel on the workpiece in a direction tangential to the wheel surface at the region of wheel-workpiece engagement, determining the effective tangential force $F_{Tmr}$ exerted by the wheel on the workpiece in a direction tangential to the wheel at the region of wheel-workpiece engagement, and whose effect is to remove material from the workpiece, by computing the value of $$F_{Tmr} = \frac{K_m \times M'}{S_r}$$

where $M'$ is the volumetric rate of material removal from the workpiece, and $S_r$ is the relative surface velocity of the rubbing contact of the wheel and workpiece, and determining a value indicative of said normal force $F_N$ as equal or proportional to the difference between said total tangential force $F_T$ and said tangential material removal force $F_{Tmr}$, divided by said coefficient $C_f$ of friction.

23. A method as set forth in claim 22 wherein the value of said normal force $F_N$ is computed from the relationship $$F_N = \frac{1}{C_f}\left(F_T - \frac{K_m \times M'}{S_r}\right)$$

24. A method as set forth in claim 22 wherein the value of the torque $TOR_w$ applied to rotationally drive the wheel, and the value of the wheel radius $R_w$, are directly or indirectly sensed and signaled during the grinding operation, and the value of the total tangential force $F_T$ is determined at different time instants from the relationship $$F_T = \frac{TOR_w}{R_w}$$

25. A method of grinding a workpiece which is restrained by at least one primary steadyrest located to oppose the tangential force applied to the workpiece by a grinding wheel, said method comprising continuously urging said steadyrest against the workpiece with a controllable force, determining the tangential force exerted on the workpiece at the grinding interface, and controlling said steadyrest force to urge said steadyrest against the workpiece with a force that varies as a function of said tangential force, whereby said steadyrest continuously counterbalances said tangential force on the workpiece.

26. A grinding method as set forth in claim 25 for grinding an elongated workpiece supported by spindles engaging the workpiece at opposite ends and wherein said steadyrest force is also controlled to urge said steadyrest against the workpiece with an additional force sufficient to prevent the workpiece from sagging due to its own weight.

27. A grinding method as set forth in claim 26 wherein said additional force is predetermined empirically by urging said steadyrest against the workpiece with increasing force until any sagging of the workpiece is eliminated.

28. A grinding method as set forth in claim 25 wherein the workpiece is also engaged by at least one secondary steadyrest located to oppose the normal force $FN$ applied to the workpiece by the grinding wheel, said method comprising the steps of continuously urging said secondary steadyrest against the workpiece with a controllable force, determining the normal force exerted on the workpiece at the grinding interface, and controlling said secondary steadyrest force to urge secondary said steadyrest against the workpiece with a force that varies as a function of said normal force, whereby said secondary steadyrest continuously counterbalances said normal force on the workpiece.

29. A grinding method as set forth in claim 28 wherein the grinding wheel and the workpiece are fed relatively into each other along a generally horizontal axis, said primary steadyrest is located on the underside of the workpiece, and said secondary steady rest is located on the opposite side of the workpiece from the grinding wheel.

30. A grinding method as set forth in claim 28 wherein said normal force is determined from the tangential force due to friction and the coefficient of friction at the grinding interface.

31. A grinding method as set forth in claim 30 wherein said normal force $F_N$ is determined from the equation:

$$F_N = \frac{F_{Tf}}{C_f}$$

where $F_{Tf}$ is said tangential force due to friction, and $C_f$ is said coefficient of friction.

32. A grinding method as set forth in claim 30 wherein said tangential force due to friction is determined from the power input to the grinding interface, the volumetric rate of material removal from the workpiece at the grinding interface, and the surface velocity of the grinding wheel relative to the workpiece at the grinding interface.

33. A grinding method as set forth in claim 31 wherein said tangential force $F_{Tf}$ is determined from the equation:

$$F_{Tf} = F_T - \frac{K_m \times M'}{S_r}$$

where $F_T$ is the total tangential grinding force, $K_m$ is the work removal constant for the material being ground, $M'$ is the volumetric rate of material removal from the workpiece at the grinding interface, and $S_r$ is the relative surface velocity of rubbing contact of the grinding wheel and the workpiece.

* * * * *